United States Patent
Guo et al.

(10) Patent No.: US 12,040,966 B2
(45) Date of Patent: Jul. 16, 2024

(54) PATH SWITCHING METHOD, DEVICE, AND SYSTEM

(71) Applicant: Huawei Technologies Co., Ltd., Shenzhen (CN)

(72) Inventors: Bingqing Guo, Beijing (CN); Sheng Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 17/502,456

(22) Filed: Oct. 15, 2021

(65) Prior Publication Data

US 2022/0124023 A1 Apr. 21, 2022

(30) Foreign Application Priority Data

Oct. 16, 2020 (CN) .......................... 202011112379.7

(51) Int. Cl.
*H04L 45/00* (2022.01)

(52) U.S. Cl.
CPC .............. *H04L 45/22* (2013.01); *H04L 45/34* (2013.01)

(58) Field of Classification Search
None
See application file for complete search history.

(56) References Cited

U.S. PATENT DOCUMENTS

| 2003/0063613 A1* | 4/2003 | Carpini | H04L 45/28 370/216 |
| 2007/0280102 A1* | 12/2007 | Vasseur | H04L 47/746 370/225 |
| 2012/0155327 A1* | 6/2012 | Fondelli | H04L 41/0816 370/254 |
| 2012/0163390 A1* | 6/2012 | Iovanna | H04L 45/10 370/400 |
| 2015/0222557 A1 | 8/2015 | Bhattacharya | |
| 2016/0352636 A1* | 12/2016 | Zheng | H04L 45/50 |
| 2017/0346720 A1* | 11/2017 | Lazzeri | H04L 45/20 |

FOREIGN PATENT DOCUMENTS

| CN | 106130901 A | 11/2016 |
| CN | 110832812 A | 2/2020 |
| CN | 111355657 A | 6/2020 |
| EP | 2458796 A1 | 5/2012 |
| WO | 2020036983 A1 | 2/2020 |

OTHER PUBLICATIONS

JP. Vasseur, Ed et al., "Path Computation Element (PCE) Communication Protocol (PCEP)," RFC 5440, Mar. 2009, 87 pages.
S. Litkowski, et al., "Path Computation Element Communication Protocol (PCEP) Extension for Label Switched Path (LSP) Diversity Constraint Signaling," Jul. 2020, 19 pages.

* cited by examiner

*Primary Examiner* — Xavier S Wong
(74) *Attorney, Agent, or Firm* — Conley Rose, P.C.

(57) ABSTRACT

A network device serving as a head node on a first path may determine, based on obtained first constraint information, whether the first path meets a constraint condition of a target service, and further determine whether to switch a packet forwarding path from the first path to another path.

23 Claims, 6 Drawing Sheets

PATH SWITCHING METHOD, DEVICE, AND SYSTEM

CROSS-REFERENCE TO RELATED APPLICATIONS

This claims priority to Chinese Patent App. No. 202011112379.7, filed on Oct. 16, 2020, which is incorporated by reference.

FIELD

This disclosure relates to the field of network technologies, and in particular, to a path switching method, a device, and a system.

BACKGROUND

In a network that supports Segment Routing Traffic Engineering (SR-TE), a head node (also referred to as a source node or an ingress node) may encapsulate, into a packet header, a segment list used to indicate a forwarding path of a packet. An intermediate node on the forwarding path only needs to forward the packet based on the path indicated by the segment list in the packet header.

In a related technology, a path computation element (PCE) may determine, based on a service-level agreement (SLA) requirement of a service, a constraint condition that a forwarding path used to forward a packet needs to meet. Further, the PCE may obtain, through computation based on a network topology diagram, a forwarding path that is between a head node and a tail node and that meets the constraint condition, and may send the forwarding path obtained through computation to the head node. In addition, to ensure reliability of packet forwarding, the PCE may obtain, through computation, and deliver two forwarding paths between the head node and the tail node: a primary forwarding path and a secondary forwarding path. After receiving the two forwarding paths, the head node may forward the packet based on the primary forwarding path. In addition, when detecting that the primary forwarding path is faulty, the head node may switch to the secondary forwarding path to forward the packet.

However, the head node switches a packet forwarding path only based on a fault status of a forwarding path, and consequently flexibility of path switching is relatively low.

SUMMARY

This disclosure provides a path switching method, a device, and a system, to resolve a technical problem of relatively low path switching flexibility in a related technology.

According to a first aspect, a path switching method is provided, where the method includes: A network device obtains first constraint information of a first path, where the first path is a packet forwarding path of the network device, the first constraint information is used to indicate whether the first path meets a constraint condition of a target service, and the network device is a head node on the first path; and the network device determines, based on the first constraint information, whether to switch the packet forwarding path from the first path to another path.

In the method provided, the network device may determine, based on whether the first path meets the path constraint condition, whether to switch a path. Compared with switching a packet forwarding path only based on a fault status of a path, the method effectively improves path switching flexibility.

Optionally, the method may further include: The network device obtains second constraint information of a second path, where the second constraint information is used to indicate whether the second path meets the constraint condition, and the second path and the first path have the same head node and a same tail node. The process in which the network device determines, based on the first constraint information, whether to switch the packet forwarding path from the first path to another path may include: The network device determines, based on the first constraint information and the second constraint information, whether to switch the first path.

The head node and the tail node of the first path and the second path may be domain border nodes, or may be tunnel endpoints. Alternatively, the head node may be the first node on a path segment of an end-to-end path, and the tail node may be the last node on the path segment.

Because the network device may determine, based on the constraint information of the two paths, whether to switch the path, it can be ensured as much as possible that the packet forwarding path is a path that meets the constraint condition, so that it can be ensured that a packet of the target service can be transmitted with high quality.

Optionally, the process in which the network device determines, based on the first constraint information and the second constraint information, whether to switch the first path may include: The network device determines, based on the first constraint information, that the first path does not meet the constraint condition, and determines, based on the second constraint information, that the second path meets the constraint condition; and the network device switches the packet forwarding path to the second path.

The packet forwarding path is switched to the second path that meets the constraint condition, so that it can be ensured that the packet of the target service can be transmitted with high quality, and a requirement of the target service can be met.

Optionally, the method may further include: The network device obtains third constraint information of a third path, where the third constraint information is used to indicate whether the third path meets the constraint condition, and the third path and the first path have the same head node and the same tail node. The process in which the network device determines, based on the first constraint information and the second constraint information, whether to switch the first path may include: The network device determines, based on the first constraint information, that the first path does not meet the constraint condition, determines, based on the second constraint information, that the second path meets the constraint condition, and determines, based on the third constraint information, that the third path meets the constraint condition; and the network device switches, based on a fact that a priority of the second path is higher than a priority of the third path, the packet forwarding path to the second path.

If there are a plurality of paths that are between the head node and the tail node and that meet the constraint condition, the network device may switch, based on priorities of the paths, the packet forwarding path to a path with a highest priority, to ensure orderly path switching.

Optionally, the process in which the network device determines, based on the first constraint information and the second constraint information, whether to switch the first path may include: The network device determines, based on the first constraint information, that the first path does not meet the constraint condition, and determines, based on the second constraint information, that the second path does not meet the constraint condition; and the network device determines not to switch the first path, or the network device switches the packet forwarding path by using a protection mechanism. The protection mechanism may include an SR best effort (SR-BE) mechanism and/or a virtual private network (VPN) fast reroute (FRR) mechanism.

When determining that none of paths between the head node and the tail node meet the constraint condition, the network device may detect whether a protection mechanism is configured for the target service. If a protection mechanism is configured, the path may be switched according to the protection mechanism configured for the target service. If no protection mechanism is configured, and the network device determines that the first path is not faulty (that is, the first path can ensure connectivity but does not ensure that the constraint condition is met), the network device may not switch the first path, and continues to use the first path for packet forwarding.

Optionally, the process in which the network device determines, based on the first constraint information and the second constraint information, whether to switch the first path may include: The network device determines, based on the first constraint information, that the first path does not meet the constraint condition, determines, based on the second constraint information, that the second path meets the constraint condition, determines that duration after the second path changes from not meeting the constraint condition to meeting the constraint condition is less than a duration threshold, and skips switching the packet forwarding path to the second path.

In one aspect, because within specific duration after the second path changes from not meeting the constraint condition to meeting the constraint condition, stability of a link status of the second path may be relatively poor, that is, the second path is likely to change to not meeting the constraint condition again. In another aspect, frequent path switching increases network load and causes unstable service running. Therefore, the network device may not use the second path to carry traffic of the target service within the duration, to avoid frequent path switching.

Optionally, both the first path and the second path may belong to a same SR tunnel. In addition, the first path and the second path are both obtained through computation based on SR traffic engineering and the constraint condition, head nodes indicated by source addresses of the first path and the second path are the same, tail nodes indicated by destination addresses of the first path and the second path are the same, and tunnel identifications of the first path and the second path are the same. Alternatively, the first path and the second path are both obtained through computation based on an SR policy and the constraint condition, head-end identifiers of the first path and the second path indicate the same head node, color identifiers of the first path and the second path are the same, and endpoint identifiers of the first path and the second path indicate the same tail node.

Optionally, the process in which the network device obtains second constraint information of a second path may include: The network device obtains the second constraint information of the second path based on a fact that the second path and the first path belong to a same path association group. For example, both the first constraint information and the second constraint information may include an identifier of the association group.

After determining that the first path used to forward the packet does not meet the constraint condition, the network device may obtain constraint information of another path that belongs to the same path association group as the first path, so as to switch the packet forwarding path to the another path in the path association group.

Optionally, the process in which a network device obtains first constraint information of a first path may include: The network device receives the first constraint information of the first path that is sent by a controller; or the network device detects whether the first path meets the constraint condition, to obtain the first constraint information of the first path.

In the solution provided, the controller may perform detection and generate the first constraint information of the first path, and the controller delivers the first constraint information to the network device. Alternatively, the network device may autonomously detect whether the first path meets the constraint condition.

Optionally, the process in which the network device receives the first constraint information of the first path that is sent by a controller may include: The network device receives the first constraint information of the first path that is sent by the controller by using the Path Computation Element Communication Protocol (PCEP); or the network device receives the first constraint information of the first path that is sent by the controller by using the Border Gateway Protocol (BGP).

The method may be applied to communications systems that support different types of protocols, and the method can be flexibly applied in different scenarios.

Optionally, the process in which the network device receives the first constraint information of the first path that is sent by the controller by using PCEP may include: The network device receives a packet that is sent by the controller by using PCEP and that carries the first constraint information, where the packet is a path computation update packet, a path computation initiate packet, or a path computation reply packet.

The controller may use different types of packets to carry the first constraint information, and flexibility of sending the first constraint information by the controller is relatively high.

Optionally, after the network device detects whether the first path meets the constraint condition, to obtain the first constraint information of the first path, the method may further include: The network device sends, to the controller, the first constraint information, and/or a path switching result determined based on the first constraint information.

In a scenario in which the network device autonomously detects whether the first path meets the constraint condition, the network device may further report the first constraint information and/or the path switching result to the controller. The controller may further present information received by the controller. In this scenario, functions of the network device are relatively rich, and functions of the controller are simplified.

Optionally, the first constraint information may include indication information, and the indication information is used to indicate whether to use the first path as the packet forwarding path. The method may further include: The network device receives the first constraint information that is sent by the controller and that includes the indication information. That the network device determines, based on the first constraint information, whether to switch the packet forwarding path from the first path to another path includes: The network device determines, based on the indication information, whether to switch the packet forwarding path from the first path to another path.

In the solution provided, the controller may determine whether to switch the packet forwarding path, and the network device only needs to perform a corresponding path switching operation based on an indication of the controller. Because the network device does not need to determine, based on the constraint information, whether to switch the path, path switching logic on the network device side is simplified.

According to a second aspect, a path switching method is provided, and the method may include: A controller generates first constraint information of a first path based on whether the first path meets a constraint condition of a target service; and the controller sends the first constraint information to a network device, where the first constraint information is used to indicate the network device to determine, based on the first constraint information, whether to switch a packet forwarding path, and the network device is a head node on the first path.

Because the network device may determine, based on the first constraint information delivered by the controller, whether to switch the path, the method effectively improves flexibility of path switching compared with switching a packet forwarding path only based on a fault status of a path.

Optionally, the process in which the controller sends the first constraint information of the first path to a network device may include: The controller sends the first constraint information of the first path to the network device by using PCEP; or the controller sends the first constraint information of the first path to the network device by using BGP.

Optionally, the process in which the controller sends the first constraint information of the first path to the network device by using PCEP may include: The controller sends, to the network device by using PCEP, a packet that carries the first constraint information, where the packet is a path computation update packet, a path computation initiate packet, or a path computation reply packet.

Optionally, the method may further include: The controller generates second constraint information of a second path based on whether the second path meets the constraint condition of the target service, where the second path and the first path have the same head node and a same tail node; and the controller sends the second constraint information to the network device. That the first constraint information is used to indicate the network device to determine, based on the first constraint information, whether to switch a packet forwarding path includes: The first constraint information and the second constraint information are used to indicate the network device to determine, based on the first constraint information and the second constraint information, whether to switch the packet forwarding path.

The controller delivers the second constraint information, so that the network device can determine, based on the constraint information of the two paths, whether to switch the path. Therefore, it can be ensured as much as possible that the packet forwarding path is a path that meets the constraint condition, and it can be ensured that a packet of the target service can be transmitted with high quality.

Optionally, the first path and the second path belong to a same path association group, and the path association group is indicated by an association group identifier. That the first constraint information and the second constraint information are used to indicate the network device to determine, based on the first constraint information and the second constraint information, whether to switch the packet forwarding path includes: The association group identifier is used to indicate the network device to determine, based on the first constraint information and the second constraint information and based on a fact that the first path and the second path belong to the same path association group, whether to switch the packet forwarding path.

The network device may obtain, based on the association group identifier, constraint information of another path that belongs to the same path association group as the first path, so as to switch the packet forwarding path to another path in the path association group.

Optionally, the first constraint information may include indication information, and the indication information is used to indicate whether to use the first path as the packet forwarding path. The process in which the controller sends the first constraint information to a network device may include: The controller sends the first constraint information including the indication information to the network device, to indicate the network device to determine, based on the indication information, whether to switch the packet forwarding path.

In a scenario in which the first constraint information further includes the indication information, the network device only needs to perform a corresponding path switching operation based on an indication of the controller. Because the network device does not need to determine, based on the constraint information, whether to switch the path, path switching logic on the network device side is simplified.

Optionally, the method may further include: The controller determines whether a second path meets the constraint condition of the target service, where the second path and the first path have the same head node and a same tail node. If the controller determines that the second path meets the constraint condition and the first path does not meet the constraint condition, the indication information is used to indicate not to use the first path to forward a packet; or if the controller determines that both the first path and the second path meet the constraint condition, the indication information is used to indicate that the first path is the packet forwarding path; or if the controller determines that neither of the first path and the second path meet the constraint condition, the indication information is used to indicate that the first path is the packet forwarding path.

It can be learned from the foregoing description that, when determining that the first path does not meet the constraint condition, the controller may indicate the network device to switch the packet forwarding path to another path that meets the constraint condition, to ensure high-quality packet transmission. If the another path also does not meet the constraint condition, the controller may indicate the network device not to perform path switching.

When determining that the first path needs to be switched or determining that the first path does not need to be switched, the controller may deliver the indication information of the first path to the network device. Alternatively, the controller may deliver the indication information of the first path only when determining that the first path needs to be switched, and skip delivering the indication information of the first path when determining that the first path does not need to be switched.

Optionally, the method may further include: The controller determines whether one or more paths other than the first path meet the constraint condition of the target service, where the one or more paths and the first path have the same head node and a same tail node; and before the controller sends the first constraint information including the indication information to the network device, the controller determines the indication information of the first path based on whether the first path and the one or more paths meet the constraint condition and/or path priorities.

That is, in the method provided, the controller may determine, based on whether each path meets the constraint condition and/or path priorities, whether to switch the packet forwarding path from the first path to another path.

According to a third aspect, a network device is provided, where the network device includes: an obtaining module configured to obtain first constraint information of a first path, where the first path is a packet forwarding path of the network device, the first constraint information is used to indicate whether the first path meets a constraint condition of a target service, and the network device is a head node on the first path; and a determining module configured to determine, based on the first constraint information, whether to switch the packet forwarding path from the first path to another path.

Optionally, the obtaining module may be further configured to obtain second constraint information of a second path, where the second constraint information is used to indicate whether the second path meets the constraint condition, and the second path and the first path have the same head node and a same tail node.

The determining module is configured to determine, based on the first constraint information and the second constraint information, whether to switch the first path.

Optionally, the determining module is configured to: determine, based on the first constraint information, that the first path does not meet the constraint condition; determine, based on the second constraint information, that the second path meets the constraint condition; and switch the packet forwarding path to the second path.

Optionally, the obtaining module may be further configured to obtain third constraint information of a third path, where the third constraint information is used to indicate whether the third path meets the constraint condition, and the third path and the first path have the same head node and the same tail node.

The determining module is configured to: determine, based on the first constraint information, that the first path does not meet the constraint condition; determine, based on the second constraint information, that the second path meets the constraint condition; determine, based on the third constraint information, that the third path meets the constraint condition; and switch, based on a fact that a priority of the second path is higher than a priority of the third path, the packet forwarding path to the second path.

Optionally, the determining module is configured to: determine, based on the first constraint information, that the first path does not meet the constraint condition; determine, based on the second constraint information, that the second path does not meet the constraint condition; and determine not to switch the first path, or switch the packet forwarding path by using a protection mechanism.

Optionally, the protection mechanism includes an SR-BE mechanism and/or a VPN FRR mechanism.

Optionally, the determining module is configured to: determine, based on the first constraint information, that the first path does not meet the constraint condition; determine, based on the second constraint information, that the second path meets the constraint condition; determine that duration after the second path changes from not meeting the constraint condition to meeting the constraint condition is less than a duration threshold; and skip switching the packet forwarding path to the second path.

Optionally, both the first path and the second path may belong to a same SR tunnel.

Optionally, the first path and the second path are both obtained through computation based on SR traffic engineering and the constraint condition, head nodes indicated by source addresses of the first path and the second path are the same, tail nodes indicated by destination addresses of the first path and the second path are the same, and tunnel identifications of the first path and the second path are the same.

Alternatively, the first path and the second path are both obtained through computation based on an SR policy and the constraint condition, head-end identifiers of the first path and the second path indicate the same head node, color identifiers of the first path and the second path are the same, and endpoint identifiers of the first path and the second path indicate the same tail node.

Optionally, the obtaining module is configured to obtain the second constraint information of the second path based on a fact that the second path and the first path belong to a same path association group.

Optionally, the obtaining module is configured to receive the first constraint information of the first path that is sent by a controller; or detect whether the first path meets the constraint condition, to obtain the first constraint information of the first path.

Optionally, the obtaining module is configured to receive the first constraint information of the first path that is sent by the controller by using PCEP; or receive the first constraint information of the first path that is sent by the controller by using BGP.

Optionally, the obtaining module is configured to receive a packet that is sent by the controller by using PCEP and that carries the first constraint information, where the packet is a path computation update packet, a path computation initiate packet, or a path computation reply packet.

Optionally, the network device further includes a sending module configured to: after the obtaining module detects whether the first path meets the constraint condition, to obtain the first constraint information of the first path, send the first constraint information to the controller, or send a path switching result determined based on the first constraint information to the controller.

Optionally, the first constraint information includes indication information, the indication information is used to indicate whether to use the first path as the packet forwarding path, and the obtaining module is configured to receive the first constraint information that is sent by the controller and that includes the indication information; and the determining module is configured to determine, based on the indication information, whether to switch the packet forwarding path from the first path to another path.

According to a fourth aspect, a controller is provided, where the controller includes: a generation module configured to generate first constraint information of a first path based on whether the first path meets a constraint condition of a target service; and a sending module configured to send the first constraint information to a network device, where the first constraint information is used to indicate the network device to determine, based on the first constraint information, whether to switch a packet forwarding path, and the network device is a head node on the first path.

Optionally, the sending module is configured to send the first constraint information of the first path to the network device by using PCEP, or send the first constraint information of the first path to the network device by using BGP.

Optionally, the sending module is configured to send, to the network device by using PCEP, a packet that carries the first constraint information, where the packet is a path computation update packet, a path computation initiate packet, or a path computation reply packet.

Optionally, the generation module is further configured to generate second constraint information of a second path based on whether the second path meets the constraint condition of the target service, where the second path and the first path have the same head node and a same tail node.

The sending module is further configured to send the second constraint information to the network device. That the first constraint information is used to indicate the network device to determine, based on the first constraint information, whether to switch a packet forwarding path includes: The first constraint information and the second constraint information are used to indicate the network device to determine, based on the first constraint information and the second constraint information, whether to switch the packet forwarding path.

Optionally, the first path and the second path belong to a same path association group, and the path association group is indicated by an association group identifier. That the first constraint information and the second constraint information are used to indicate the network device to determine, based on the first constraint information and the second constraint information, whether to switch the packet forwarding path includes: The association group identifier is used to indicate the network device to determine, based on the first constraint information and the second constraint information and based on a fact that the first path and the second path belong to the same path association group, whether to switch the packet forwarding path.

Optionally, the first constraint information includes indication information, and the indication information is used to indicate whether to use the first path as the packet forwarding path. That the controller sends the first constraint information to a network device includes: The controller sends the first constraint information including the indication information to the network device, to indicate the network device to determine, based on the indication information, whether to switch the packet forwarding path.

Optionally, the generation module is further configured to determine whether a second path meets the constraint condition of the target service. The second path and the first path have the same head node and a same tail node.

If the generation module determines that the second path meets the constraint condition and the first path does not meet the constraint condition, the indication information is used to indicate not to use the first path to forward a packet.

If the generation module determines that both the first path and the second path meet the constraint condition, the indication information is used to indicate that the first path is the packet forwarding path.

If the generation module determines that neither of the first path and the second path meet the constraint condition, the indication information is used to indicate that the first path is the packet forwarding path.

Optionally, the generation module is further configured to: determine whether one or more paths other than the first path meet the constraint condition of the target service, where the one or more paths and the first path have the same head node and a same tail node; and before the sending module sends the first constraint information including the indication information to the network device, determine the indication information of the first path based on whether the first path and the one or more paths meet the constraint condition and/or path priorities.

According to a fifth aspect, a network device is provided, where the network device includes a memory and a processor. The memory is configured to store a computer program, and the processor is configured to execute the computer program stored in the memory, to enable the network device to perform the path switching method provided in the first aspect.

According to a sixth aspect, a controller is provided, where the controller includes a memory and a processor. The memory is configured to store a computer program, and the processor is configured to execute the computer program stored in the memory, to enable the controller to perform the path switching method provided in the second aspect.

According to a seventh aspect, a computer-readable storage medium is provided. The computer-readable storage medium stores instructions, and when the instructions are executed by a processor, the path switching method provided in the first aspect is implemented, or the path switching method provided in the second aspect is implemented.

According to an eighth aspect, a communications system is provided. The system includes the network device provided in the third aspect or the fifth aspect, and the controller provided in the fourth aspect or the sixth aspect.

In conclusion, the embodiments provide a path switching method, a device, and a system. The network device serving as the head node on the first path may determine, based on the obtained first constraint information, whether the first path meets the constraint condition of the target service, and further determine whether to switch the packet forwarding path from the first path to another path. Compared with switching a packet forwarding path only based on a fault status of a path, the method provided in the embodiments effectively improves flexibility of path switching. In addition, it can be further ensured as much as possible that the packet forwarding path is a path that meets the constraint condition, so that the packet of the target service can be transmitted with high quality.

DETAILED DESCRIPTION

The following describes in detail a path switching method, a device, and a system provided in the embodiments with reference to the accompanying drawings.

It should be understood that "at least one" mentioned in this specification means one or more, and "a plurality of" means two or more. In the description, to clearly describe the technical solutions in the embodiments, words such as "first" and "second" are used to distinguish between same items or similar items whose functions are basically the same. A person skilled in the art may understand that the terms such as "first" and "second" do not constitute a limitation on a quantity or an execution sequence. The terms "system" and "network" may be used interchangeably in this specification.

Figure 1:
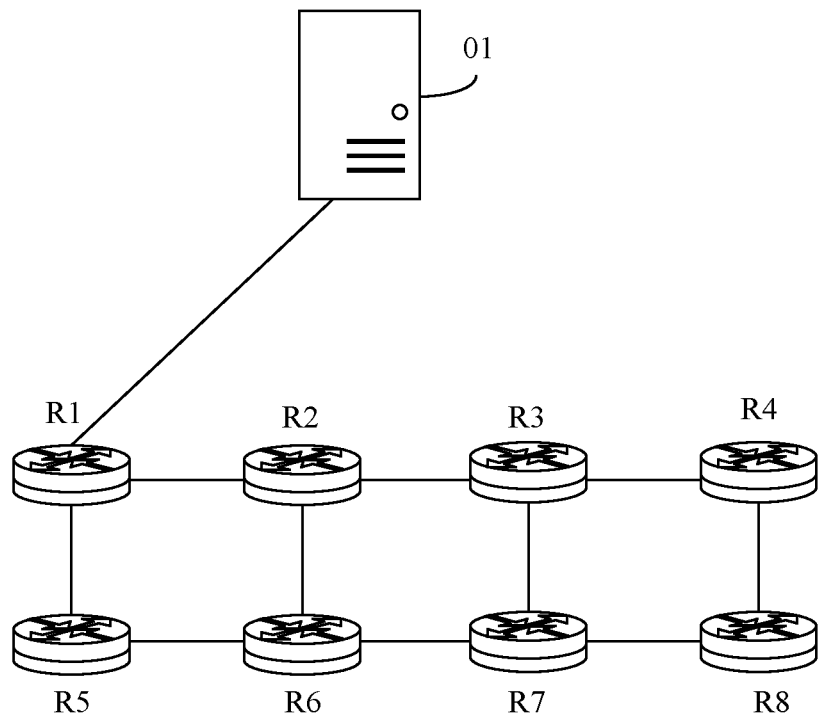
FIG. 1 is a schematic diagram of a structure of a communications system to which a path switching method is applied according to an embodiment.

Before the embodiments are described, a scenario of the embodiments is first described. FIG. 1 is a schematic diagram of a structure of a communications system to which a path switching method is applied according to an embodiment. As shown in FIG. 1, the system may include a controller 01 and a plurality of network devices. For example, FIG. 1 schematically shows eight network devices in total from R1 to R8. A communication connection is established between the controller 01 and at least one network device, and communication connections may be established between the plurality of network devices. The controller 01 may be a software-defined networking (SDN) controller, for example, may be a PCE server. In addition, the controller 01 may be a server, a server cluster including several servers, or a cloud computing service center. Each network device may be a provider edge (PE) device, a provider (P) device, or the like, and each network device may be a device that has a packet forwarding function, such as a router or a switch.

An example in which the controller 01 is a PCE server is used to describe functions of the controller 01. In the plurality of network devices, a head-end network device (namely, a head node) serving as a path computation client (PCC) may send a path computation request to the controller 01 by using the PCEP. In response to the path computation request, the controller 01 may obtain, through computation, a path that meets a constraint condition and that is between the PCC and a tail-end network device (that is, a tail node), and may deliver the path to the PCC by using PCEP. The PCC may further forward the packet based on the path.

In this embodiment, the controller 01 may include a traffic analysis module, a path computation module, and an operation and maintenance management module. The traffic analysis module may be configured to implement traffic optimization policy editing, tunnel triggering, traffic collection and analysis, visualized presentation of tunnel and link traffic, path presentation, and optimization simulation requesting. The path computation module may be configured to implement optimization tunnel generation, optimization path computation, tunnel data delivery, network topology collection, and label-switched path (LSP) data collection. The operation and maintenance management module may be configured to implement basic configuration (except modification of a tunnel, an optimization policy, and a topology attribute, and deployment of performance detection) and alarm handling.

In an SR-TE hot standby (HSB) scenario, the controller 01 may obtain, through computation, and deliver two forwarding paths that meet a constraint condition of a service, where each path may be an LSP. In a related technology, if a primary LSP cannot meet the constraint condition within a period of time due to a sudden factor (for example, instantaneous link congestion), the controller 01 may perform path optimization. However, if the controller 01 cannot find the third available forwarding path other than the primary LSP and a secondary LSP, to enable the service to be switched to the secondary LSP, the controller 01 can only deliver a path computation update (PCUpd) packet to the head node of the path, to indicate the head node to delete the primary LSP. In this case, the service is forcibly switched to the secondary LSP. After the head node deletes the primary LSP, if a link or node failure occurs on the secondary LSP, service traffic can be forwarded only through an SR-BE mechanism. The SR-BE mechanism computes a packet forwarding path based on an affinity attribute such as a cost value of the interior gateway protocol (IGP). As a result, traffic engineering is meaningless.

The embodiments provide a path switching method. A network device serving as a head node on a path may obtain constraint information of the path, and the constraint information may indicate whether the path meets a constraint condition of a target service. The network device may further determine, based on the constraint information, whether to switch a packet forwarding path. Compared with path switching based on fault information, the method provided in the embodiments effectively improves flexibility of path switching. The constraint information of the path that is obtained by the network device may be delivered by the controller 01, or may be generated by the network device after automatic detection.

The following describes in detail the path switching method provided in the embodiments.

Figure 2:
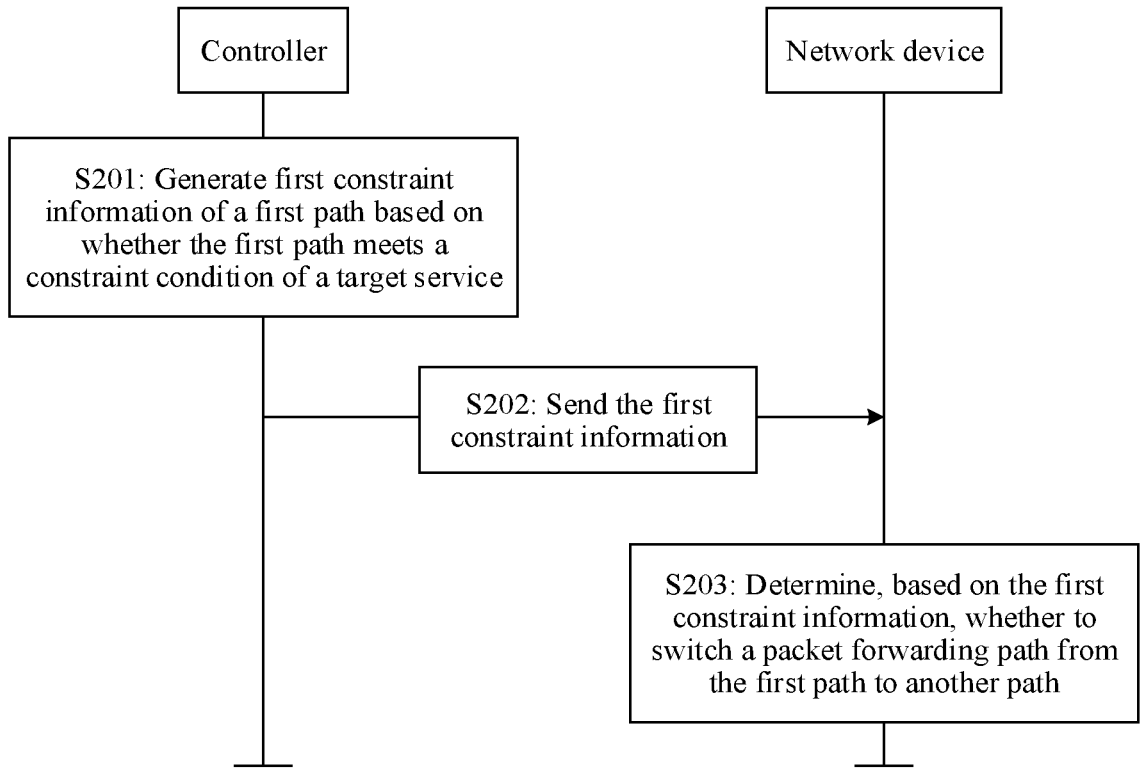
FIG. 2 is a flowchart of a path switching method according to an embodiment.

FIG. 2 is a flowchart of a path switching method according to an embodiment. The method may be applied to the communications system shown in FIG. 1. In this embodiment, an example in which the controller 01 generates the constraint information and delivers the constraint information to the network device is used for description. Refer to FIG. 2. The method may include the following steps.

S201: A controller generates first constraint information of a first path based on whether the first path meets a constraint condition of a target service.

The first path is a path obtained by the controller through computation based on the constraint condition of the target service, and the first path is a path currently used by a network device to forward a packet. The controller may be connected to at least one network device on the first path, and may receive detection data that is of the first path and that is reported by the network device connected to the controller. Further, the controller may determine, based on the received detection data, whether the first path meets the constraint condition of the target service, and generate the first constraint information of the first path. The constraint condition may include a constraint on at least one of the following parameters: a delay, a packet loss rate, jitter, bandwidth utilization, and the like. Correspondingly, the detection data reported by the network device to the controller includes the at least one parameter.

The first path obtained through computation may be a complete path for forwarding a packet on a network side. For example, the first path corresponds to an LSP labeled path from an ingress node to an egress node, and the LSP labeled path is a segment of path in an end-to-end forwarding path of the packet. In other possible scenarios, the first path may alternatively be any other segment of path in the end-to-end forwarding path of the packet, or the like. This may be determined with reference to a scenario.

S202: The controller sends the first constraint information to the network device.

The network device may be a head node on the first path, that is, the controller may deliver the first constraint information of the first path to the head node on the first path. The head node is a start node on the first path, and a role of the head node may be, for example, the ingress node on the LSP labeled path. The first constraint information may be used to indicate the network device to determine, based on the first constraint information, whether to switch the packet forwarding path.

S203: The network device determines, based on the first constraint information, whether to switch the packet forwarding path from the first path to another path.

After receiving the first constraint information delivered by the controller, the network device may determine whether the first path meets the constraint condition of the target service, and further determine whether to switch the packet forwarding path from the first path to another path.

It should be understood that S201 may alternatively be performed by the network device serving as the head node on the first path, and S202 may be skipped. That is, the head node on the first path may directly detect whether the first path meets the constraint condition of the target service, to obtain the first constraint information.

In conclusion, this embodiment provides a path switching method. The network device serving as the head node on the first path may determine, based on the obtained first constraint information, whether the first path meets the constraint condition of the target service, and further determine whether to switch the packet forwarding path from the first path to another path. Compared with switching a packet forwarding path only based on a fault status of a path, the method effectively improves flexibility of path switching. In addition, it can be further ensured as much as possible that the packet forwarding path is a path that meets the constraint condition, so that the packet of the target service can be transmitted with high quality.

Figure 3:
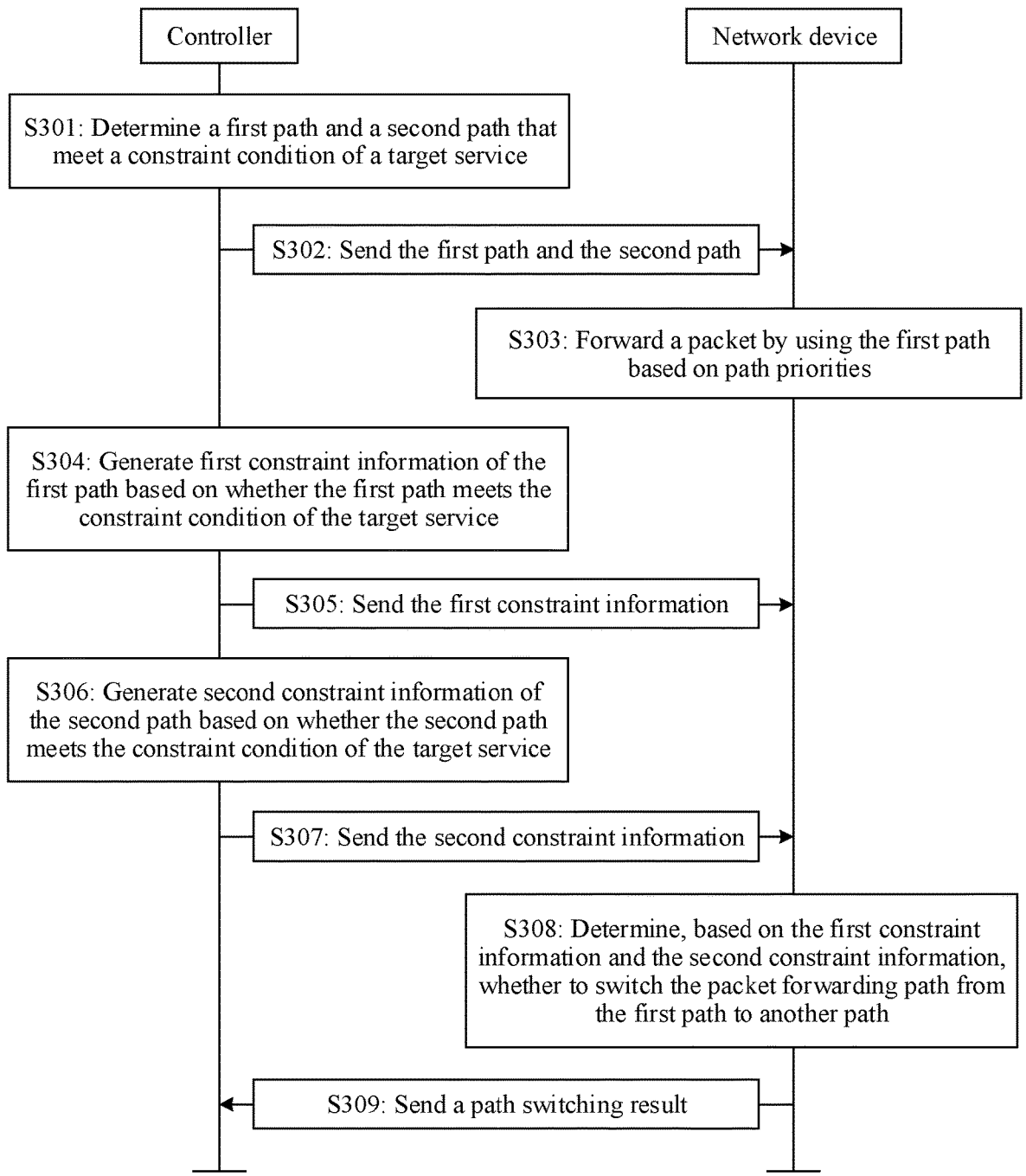
FIG. 3 is a flowchart of another path switching method according to an embodiment.

FIG. 3 is a flowchart of another path switching method according to an embodiment. The method may be applied to the communications system shown in FIG. 1. In this embodiment, an example in which the controller 01 generates constraint information of each path and delivers the constraint information of the path to the network device is used for description. Refer to FIG. 3. The method may include the following steps.

S301: A controller determines a first path and a second path that meet a constraint condition of a target service.

In this embodiment, the controller may obtain, from the communications system through computation based on the constraint condition of the target service and obtained link statuses between all network devices in the communications system, the first path and the second path that are between a head node and a tail node of the target service and that meet the constraint condition. That is, the first path and the second path have the same head node and the same tail node. The constraint condition may include a constraint on at least one of the following parameters: a delay, a packet loss rate, jitter, bandwidth utilization, and the like. In addition, the constraint condition may be determined based on the SLA or a similar service agreement. The tail node is a terminating node on the first path, and a role of the tail node may be, for example, an egress node on an LSP labeled path.

Optionally, the controller learns, through computation, that both the first path and the second path that are between the head node and the tail node and that meet the constraint condition may belong to a same SR tunnel.

In an optional implementation, both the first path and the second path may be obtained through computation based on SR-TE and the constraint condition. In this implementation, head nodes indicated by source addresses of the first path and the second path are the same, tail nodes indicated by destination addresses of the first path and the second path are the same, and tunnel identifications (IDs) of the first path and the second path are the same. The source address, the destination address, and the tunnel identification may all be carried in an LSP identifier (LSP-IDENTIFIER) field of the path.

In another optional implementation, both the first path and the second path may be obtained through computation based on an SR policy and the constraint condition. In this implementation, head nodes indicated by head-end identifiers of the first path and the second path are the same, color identifiers of the first path and the second path are the same, and tail nodes indicated by endpoint identifiers of the first path and the second path are the same. The SR policy may be the SR-TE policy, or may be the Segment Routing over Internet Protocol version 6 (SRv6) policy.

It should be understood that the head node and the tail node of the first path and the second path may be domain border nodes, or may be tunnel endpoints. Alternatively, the head node may be the first node on a path segment of an end-to-end path, and the tail node may be the last node on the path segment. Locations of the head node and the tail node in a network topology are not limited in this embodiment of.

S302: The controller sends the first path and the second path to a network device.

After obtaining the first path and the second path through computation, the controller may send the first path and the second path to the network device that serves as the head node of the two paths. In this embodiment, the controller may notify the paths by sending path indication information to the network device. In an optional implementation, the path indication information may include, for example, identifiers of network devices through which the path passes, and/or identifiers of links between two adjacent network devices. In a case, the path sent by the controller to the network device is a strict path, for example, the path indication information carries a node identifier for hop-by-hop forwarding. In another case, the path sent by the controller to the network device is a loose path. For example, the path indication information carries a node identifier of a key node that the path needs to pass through. An identifier of each network device may be a label or an IP address of the network device. An identifier of a link between every two adjacent network devices may be a label of the link, or may be referred to as an adjacency label.

An example in which the controller sends a strict path is used. It is assumed that the first path successively passes through four network devices A, B, C, and D. There are two equal-cost links between the network device A and the network device B, and labels of the two links are 1 and 2 respectively. A label of a link between the network device B and the network device C is 3, and a label of a link between the network device C and the network device D is 4. In this case, the first path (path 1) delivered by the controller to the network device A may be represented as: path 1={1, 3, 4}. The first path indicates that the network device A needs to send a packet to the network device B through the link whose label is 1, the network device B needs to send the packet to the network device C through the link whose label is 3, and the network device C needs to send the packet to the network device D through the link whose label is 4.

Optionally, the controller may deliver the first path and the second path in descending order of priorities based on determined priorities of the first path and the second path.

It should be understood that if another path other than the first path and the second path in the communications system also meets the constraint condition, the controller may obtain, through computation, the another path other than the first path and the second path. That is, the controller may determine all paths that meet the constraint condition in the communications system. Correspondingly, the controller may deliver, to the network device, all the paths that are obtained by the controller through computation and that meet the constraint condition.

For example, it is assumed that a network topology of the communications system is shown in FIG. 1, the head node of the target service is the network device R1, and the tail node is the network device R8. Paths between the network device R1 and the network device R8 that are obtained by the controller 01 through computation and that meet the constraint condition of the target service include the first path, the second path (path 2), and a third path (path 3). In this case, the controller 01 may sequentially deliver the three paths to the network device R1.

It should be further understood that, when delivering each path to the network device, the controller may synchronously deliver constraint information of the path. Because each path is obtained through computation based on the constraint condition, each path delivered by the controller meets the constraint condition, that is, constraint information of each path may indicate that the path meets the constraint condition. In another possible case, the controller may asynchronously deliver path information and constraint information indicating whether the path meets the constraint condition. For example, the controller may first deliver path information, allocate a corresponding identifier to the path, and then deliver constraint information corresponding to the path, where the constraint information carries the corresponding identifier previously allocated to the path, to indicate an association between the constraint information and the path.

S303: The network device forwards the packet by using the first path based on priorities of the paths.

After receiving the first path and the second path delivered by the controller, the network device serving as the head node on the path may determine the priorities of the paths. In this embodiment, an example in which a priority of the first path is higher than a priority of another path is used for description. In this case, the network device may forward the packet by using the first path.

Optionally, if the controller delivers the paths in descending order of the priorities of the path, the network device may determine the priorities of the paths based on a delivery order of the paths. If the controller delivers a plurality of paths at a time, the controller may further deliver a priority identifier of each path to the network device, and the network device may further determine a priority of each path based on the priority identifier.

For example, refer to FIG. 1. If the controller 01 sequentially delivers the first path, the second path, and the third path to the network device R1, the network device R1 may forward the packet by using the first path based on the path delivery order.

S304: The controller generates first constraint information of the first path based on whether the first path meets the constraint condition of the target service.

In this embodiment, the controller may be connected to at least one network device on the first path, and may receive detection data that is of the first path and that is reported by the network device connected to the controller. Further, the controller may determine, based on the received detection data, whether the first path meets the constraint condition of the target service, and generate the first constraint information of the first path. The first constraint information may reflect whether the first path meets the constraint condition.

Optionally, each network device on the first path may support a detection protocol such as in-situ flow information telemetry (IFIT) or the two-way active measurement protocol (TWAMP). In addition, each network device on the first path may detect detection data of the first path based on the detection protocol, and report the detection data to the controller in real time. For example, each network device may report detection data to the controller by using a telemetry technology. Further, the controller may determine, based on the received detection data, whether the first path meets the constraint condition, and generate the first constraint information of the first path.

For example, it is assumed that the constraint condition of the target service includes: a delay≤T0, and a packet loss rate≤P0. If the controller 01 determines, based on the received detection data, that a delay of the first path is greater than T0 or a packet loss rate of the first path is greater than P0 within a time period, the controller 01 may determine that the first path does not meet the constraint condition, and generate the first constraint information used to indicate that the first path does not meet the constraint condition.

S305: The controller sends the first constraint information to the network device.

The network device is the head node on the first path, that is, the controller may deliver the first constraint information of the first path to the head node on the first path. The first constraint information may be used to indicate the network device to determine, based on the first constraint information, whether to switch a packet forwarding path. Optionally, the controller may send the first constraint information of the first path to the network device by using PCEP, or the controller may send the first constraint information of the first path to the network device by using BGP. Because the method provided in this embodiment may be applied to communications systems that support different types of protocols, scenarios of the method are relatively flexible, and compatibility is relatively good.

In the scenario in which the controller sends the first constraint information to the network device by using PCEP, the controller may be a PCE, and the network device may be a PCC. In addition, the controller may send, to the network device by using PCEP, a first packet that carries the first constraint information. The first packet may be a PCUpd packet, a path computation initiate (PCInitiate) packet, a path computation reply (PCRep) packet, or the like. The controller may use a plurality of different types of packets to carry the first constraint information, so that flexibility of sending the first constraint information is relatively high.

Optionally, in this embodiment, the controller may group all paths that are between the head node and the tail node and that meet the constraint condition into a same path association group, and the path association group may be indicated by an association group identifier. Only one path in each path association group can be used to forward a packet, that is, only one path can be used to carry traffic of the target service. Correspondingly, the first constraint information sent by the controller to the network device may further include an association group identifier of a path association group to which the first path belongs. Because each path in the path association group meets the constraint condition determined based on the SLA, the path association group may also be referred to as an SLA-constrained path group (SCPG).

Figure 4:
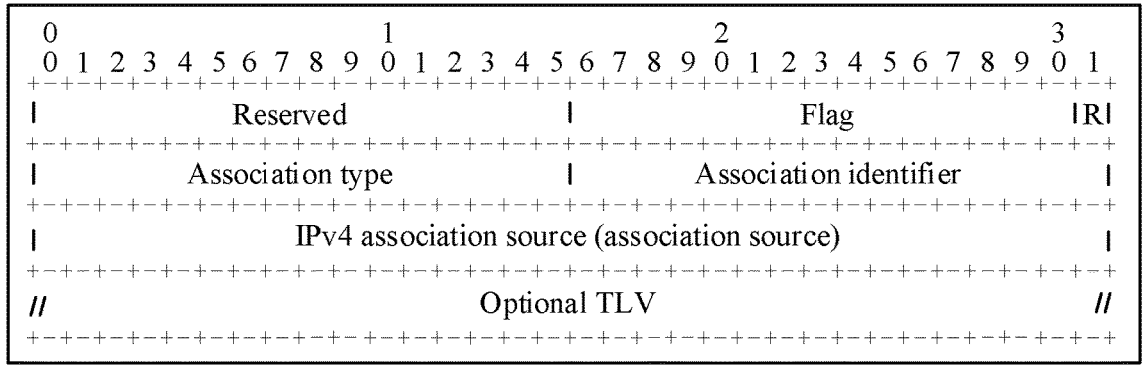
FIG. 4 is a schematic diagram of a data format of an ASSOCIATION object according to an embodiment.
Figure 5:
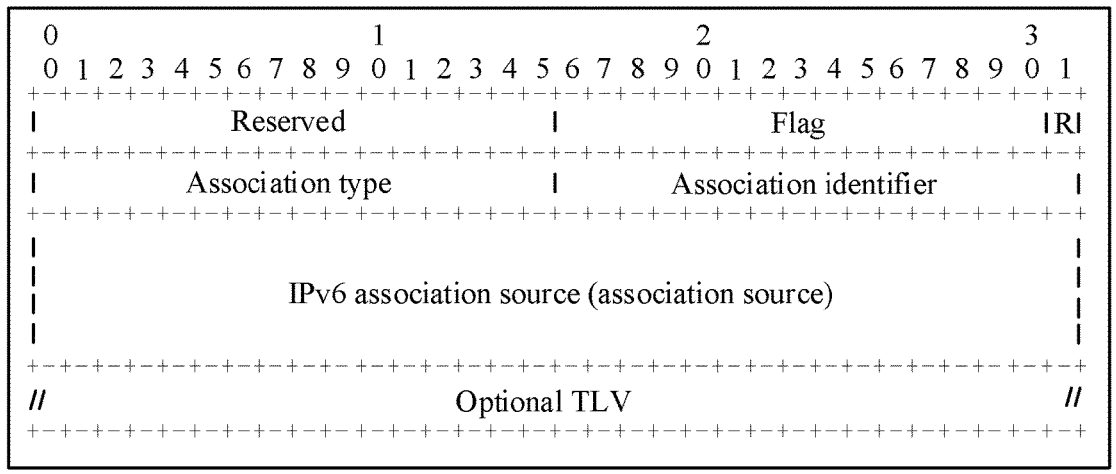
FIG. 5 is a schematic diagram of a data format of another ASSOCIATION object according to an embodiment.

Request for Comments (RFC) 8697 defines an ASSOCIATION object, which is used to indicate an association relationship between a plurality of paths. Refer to FIG. 4 and FIG. 5. The ASSOCIATION object may include an association type field whose length is two bytes. The field may be used to define an association type of a plurality of paths. With reference to FIG. 4 and FIG. 5, it can be further learned that the ASSOCIATION object may further include a reserved (R) field, a flag field, an association ID field, an association source address field, and an optional type-length-value (TLV) field. The association source address field is used to carry a source address of a path. As shown in FIG. 4, the source address may be an IPv4 address, or as shown in FIG. 5, the source address may be an IPv6 address.

In this embodiment, the first constraint information may be carried by using the ASSOCIATION object. For example, the association type field in the ASSOCIATION object may be used to carry the association group identifier of the path association group to which the first path belongs, and the optional TLV field may be used to carry a flag bit that is in the first constraint information and that is used to indicate whether the first path meets the constraint condition.

Figure 6:
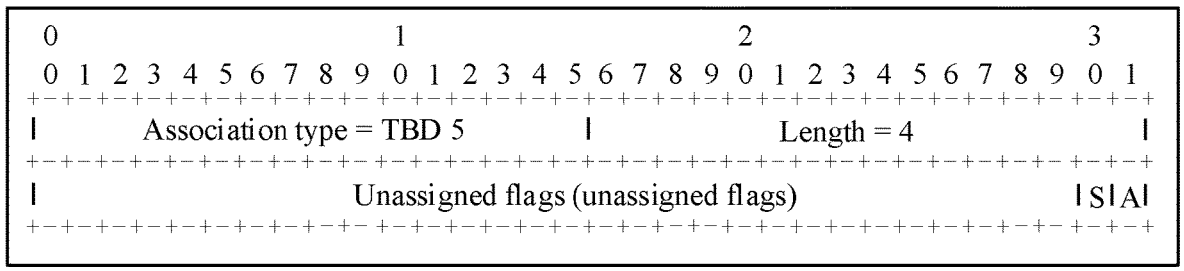
FIG. 6 is a schematic diagram of a structure of a field used to carry first constraint information according to an embodiment.

For example, the first packet sent by the controller 01 to the network device R1 may include the ASSOCIATION object. A structure of a field that is in the ASSOCIATION object and that is used to carry the first constraint information may be shown in FIG. 6. Refer to FIG. 6. The association group identifier that is of the path association group to which the first path belongs and that is carried in the association type field of the ASSOCIATION object may be TBD 5. In addition, one bit in the optional TLV field in the ASSOCIATION object may be used as a flag bit S. The flag bit S may be used to indicate whether the first path meets the constraint condition. For example, when a value of the flag bit S is 1, the flag bit S may indicate that the first path meets the constraint condition; when the value of the flag bit S is 0, the flag bit S may indicate that the first path does not meet the constraint condition.

S306: The controller generates second constraint information of the second path based on whether the second path meets the constraint condition of the target service.

In this embodiment, the controller may detect, based on detection data reported by at least one network device on the second path, whether the second path meets the constraint condition of the target service, and generate the second constraint information of the second path. For an implementation process of S306, refer to S304. Details are not described herein again.

S307: The controller sends the second constraint information to the network device.

The controller may send the second constraint information to the network device by using PCEP. Alternatively, the controller may send the second constraint information to the network device by using BGP. For an implementation process of S307, refer to S305. Details are not described herein again.

It should be understood that the second constraint information may also be carried in the ASSOCIATION object. In addition, the controller may use different first packets to separately carry the first constraint information and the second constraint information. Alternatively, the controller may use one first packet to carry the first constraint information and the second constraint information.

It should be further understood that, when detecting that any path in the path association group changes a constraint condition meeting status (for example, changes from meeting the constraint condition to not meeting the constraint condition, or changes from not meeting the constraint condition to meeting the constraint condition), the controller may deliver, to the network device, constraint information of the path that changes the constraint condition meeting status, but does not need to deliver constraint information of another path that does not change a constraint condition meeting status. Alternatively, when detecting that any path changes a constraint condition meeting status, the controller may deliver constraint information of each path in the path association group to the network device.

For example, when detecting that the first path changes from meeting the constraint condition to not meeting the constraint condition, the controller 01 may send a first packet to the network device R1, where the first packet may include the first constraint information of the first path, but does not include constraint information of another path. Alternatively, the first packet includes not only the first constraint information of the first path, but also the second constraint information of the second path, and third constraint information of the third path. An association group identifier in each piece of constraint information may be TBD 5, the flag bit S in the first constraint information may be 0, and a flag bit S in the second constraint information and a flag bit S in the third constraint information may be 1.

S308: The network device determines, based on the first constraint information and the second constraint information, whether to switch the packet forwarding path from the first path to another path.

After receiving the first constraint information delivered by the controller, if the network device determines, based on the first constraint information, that the first path meets the constraint condition, the network device may determine not to switch the packet forwarding path from the first path to another path. If the network device determines, based on the first constraint information, that the first path does not meet the constraint condition, the network device may obtain the second constraint information of the second path that belongs to the same path association group as the first path. The network device may further determine, based on the second constraint information, whether to switch the packet forwarding path from the first path to another path.

It should be understood that if the path association group to which the first path belongs further includes paths other than the second path, the network device may further obtain constraint information of each of the other paths. Further, the network device may determine, based on the second constraint information and the constraint information of each of the other paths, whether to switch the packet forwarding path from the first path to another path. In a process of selecting an alternative forwarding path from other paths, the network device may sequentially determine, with reference to priorities of the paths, whether the paths meet the constraint condition, and finally determine a path that meets the constraint as the alternative forwarding path.

Optionally, constraint information of each path obtained by the network device may further include an association group identifier of a path association group to which the path belongs. After determining that the first path does not meet the constraint condition, the network device may obtain, based on the association group identifier, constraint information of other paths that belong to the same path association group as the first path.

An example in which the path association group to which the first path belongs includes only the first path and the second path is used for description below.

In a possible scenario, if the network device determines, based on the first constraint information, that the first path does not meet the constraint condition, and determines, based on the second constraint information, that the second path meets the constraint condition, the network device may switch the packet forwarding path from the first path to the second path.

That is, the network device may switch the packet forwarding path to a path that meets the constraint condition, to ensure that the packet forwarding path obtained after switching can meet a requirement of the target service.

In another possible scenario, if the network device determines, based on the first constraint information, that the first path does not meet the constraint condition, and determines, based on the second constraint information, that the second path does not meet the constraint condition, the network device may determine not to switch the first path, or the network device may switch the packet forwarding path by using a protection mechanism. In other words, when determining that neither of the paths in the path association group to which the first path belongs meet the constraint condition, the network device may determine not to switch the first path, or switch the packet forwarding path by using the protection mechanism.

For example, if the network device detects that no protection mechanism is configured for the target service and determines that the first path is not faulty (that is, the first path can ensure connectivity), the network device may not switch the first path. If the network device detects that a protection mechanism is configured for the target service, the network device may switch the packet forwarding path by using the protection mechanism. The protection mechanism may include an SR-BE mechanism and/or a VPN FRR mechanism.

Optionally, different protection mechanisms may be configured for different services. Correspondingly, the network device may obtain the protection mechanism configured for the target service, and switch the packet forwarding path by using the protection mechanism configured for the target service.

In still another possible scenario, if the network device determines, based on the first constraint information, that the first path does not meet the constraint condition, determines, based on the second constraint information, that the second path meets the constraint condition, and determines that duration after the second path changes from not meeting the constraint condition to meeting the constraint condition is less than a duration threshold, the network device may not switch the packet forwarding path to the second path.

Stability of a link status of the second path is relatively poor within specific duration after the second path changes from not meeting the constraint condition to meeting the constraint condition, that is, the second path is likely to change to not meeting the constraint condition again. Therefore, to avoid frequent path switching, the network device may start timing of a timer after determining that the second path changes from not meeting the constraint condition to meeting the constraint condition. If timing duration is less than the duration threshold, the second path is not used to carry traffic of the target service.

Optionally, the network device may count duration after the second path changes from meeting the constraint condition to not meeting the constraint condition. If the second path changes to meeting the constraint condition again before the duration reaches a duration threshold, the network device may not switch the packet forwarding path to the second path. In this way, it can be ensured that the second path is used to carry traffic after the link status of the second path is stable.

When the path association group to which the first path belongs further includes another path other than the second path, if the network device determines, based on the first constraint information, that the first path does not meet the constraint condition, and determines, based on the second constraint information and constraint information of the another path, that at least two paths in the path association group other than the first path meet the constraint condition, the network device may switch the packet forwarding path to a path with a highest priority in the at least two paths that meet the constraint condition.

For example, the path association group to which the first path belongs further includes the third path, and the network device determines, based on the first constraint information, that the first path does not meet the constraint condition, determines, based on the second constraint information, that the second path meets the constraint condition, and determines, based on the third constraint information, that the third path meets the constraint condition. In this case, the network device may switch, based on a fact that the priority of the second path is higher than a priority of the third path, the packet forwarding path from the first path to the second path.

It should be understood that, to ensure smooth path switching, the network device may switch, by using a switch-delay procedure, the packet forwarding path from the first path to another path. The switch-delay procedure means that during path switching, a forwarding entry of the first path is not deleted until it is detected that the another path (for example, the second path) is stable, so as to complete switching from the first path to the another path.

Although in the foregoing example, the network device determines, by using the explicitly identified path association group, a path that can be used for switching, in another possible case, the explicitly identified path association group may not exist, and the network device directly determines, based on other attribute information, another forwarding path that can be used to replace the first path. For example, the network device determines, based on local information and related information carried in a packet, that the second path is used as a path whose head node and tail node are the same as the first path, and may be used as an optional path for switching when the second path meets the constraint condition.

S309: The network device sends a path switching result to the controller.

In this embodiment, after determining not to switch the first path or determining to switch the packet forwarding path from the first path to another path, the network device may further send a path switching result to the controller. Optionally, the network device may send the path switching result to the controller by using PCEP or BGP.

In a scenario in which the network device sends the path switching result to the controller by using PCEP, the network device may send, to the controller by using PCEP, a second packet that carries the path switching result. The second packet may be a path computation request (PCReq) packet, or a path computation report (PCRpt) packet.

In addition, the second packet may carry the path switching result by using an ASSOCIATION object. A structure of a field that is in the ASSOCIATION object and that is used to carry the path switching result may also be shown in FIG. 6. That is, in this embodiment, a new field may be defined in the ASSOCIATION object to carry path constraint information and the path switching result. The new field may be referred to as an SLA-constrained association field. Referring to FIG. 6, one bit in an optional TLV field of the ASSOCIATION object may be used as an indicator bit A. The indicator bit A may be used to indicate whether a path is the packet forwarding path. For example, when a value of the indicator bit A is 1, the indicator bit A may indicate that the path is the packet forwarding path; when the value of the indicator bit A is 0, the indicator bit A may indicate that the path is not used to forward a packet.

Therefore, in this embodiment, if the network device does not switch the first path, the path switching result sent by the network device to the controller may include only an indicator bit of the first path. If the network device switches from the first path to another path, the switching result sent by the network device to the controller may include the indicator bit of the first path and an indicator bit of the another path that is used to forward a packet after switching. Alternatively, regardless of whether the network device switches the first path, the path switching result sent by the network device to the controller may include indicator bits of all paths in the path association group to which the first path belongs.

The following uses the network topology shown in FIG. 1 as an example, and uses an example in which the controller 01 obtains, through computation, the first path, the second path, and the third path that are between the head node R1 and the tail node R8 and that meet the constraint condition, to describe the path switching method provided in this embodiment.

After obtaining, through computation, the three paths that meet the constraint condition, the controller 01 may sequentially deliver the three paths to the network device R1 by using PCUpd packets. The PCUpd packets used to deliver the paths may each include an ASSOCIATION object, a flag bit S in each ASSOCIATION object is set to 1, and an indicator bit A in each ASSOCIATION object is set to null. The network device R1 may further determine, based on a delivery order of the three paths, the first path as the packet forwarding path.

If the controller 01 detects that the first path does not meet the constraint condition in a time period, the controller 01 may deliver a PCUpd packet to the network device R1. The PCUpd packet carries a path identifier of the first path, a flag bit S in an SLA-Constrained Association field in the PCUpd packet is 0, and an indicator bit A is set to null. If the network device R1 learns, based on the PCUpd packet, that the first path does not meet the constraint condition, and determines that the flag bit S of the second path is 1, the network device R1 may switch the packet forwarding path to the second path. In addition, the network device R1 may send a PCRpt packet to the controller 01 to report a path switching result. The PCRpt packet carries a path identifier of each of the three paths. The flag bit S of the first path is 0, and the indicator bit A of the first path is 0; the flag bit S of the second path is 1, and the indicator bit A of the second path is 1; the flag bit S of the third path is 1, and the indicator bit A of the third path is 0. Each of the three paths may be an LSP, and the path identifier of each path may be an LSP-ID.

In a period of time after the network device R1 switches the packet forwarding path to the second path, if the controller 01 detects that the second path does not meet the constraint condition, the controller 01 may deliver a PCUpd packet that carries the second constraint information of the second path to the network device R1. The network device R1 may further determine, based on the second constraint information, that the second path does not meet the constraint condition. If the network device R1 determines that the flag bit S of the third path is 1, the network device R1 may switch the packet forwarding path from the second path to the third path.

It should be understood that, when the network device determines that the second path does not meet the constraint condition, if the network device determines that the flag bit S of the first path has been updated to 1, that is, the first path has been updated to meet the constraint condition (for example, traffic congestion has been cleared), the network device R1 may switch, based on the delivery order of the three paths, the packet forwarding path to the third path, instead of switching back to the first path. In other words, in a scenario in which a plurality of paths meet the constraint condition, the network device may switch the packet forwarding path based on a path delivery order.

In a period of time after the network device R1 switches the packet forwarding path to the third path, if the controller 01 detects that the third path does not meet the constraint condition, the controller 01 may deliver a PCUpd packet that carries the third constraint information of the third path to the network device R1. Then, the network device R1 may traverse values of the flag bit S of the first path and the flag bit S of the second path. If the flag bit S of the first path is 1, the packet forwarding path may be switched to the first path. If the flag bit S of the first path is 0, the network device R1 may continue to check the flag bit S of the second path. If the flag bit S of the second path is 1, the packet forwarding path may be switched to the second path. If the flag bit S of the second path is 0, the network device R1 may determine whether a lower-level protection mechanism (such as SR-BE or VPN FRR) is configured for the target service. If the protection mechanism is configured, the protection mechanism can be used to switch the packet forwarding path. If no protection mechanism is configured, and it is determined, based on a bidirectional forwarding detection (BFD) mechanism, that the third path is not faulty (that is, the third path can ensure connectivity but cannot ensure that the constraint condition is met), the packet forwarding path may not be switched, that is, the third path continues to be used for packet forwarding.

In the foregoing path switching process, to avoid frequent switchback of traffic, when detecting that a flag bit S of any path changes from 0 to 1, the network device R1 may start a timer for the path, and before timing duration exceeds a duration threshold, the path is not used for packet forwarding. In addition, when detecting that a flag bit S of any path changes from 1 to 0, the network device R1 may also start a timer for the path. Before timing duration exceeds a duration threshold, the path is not used for packet forwarding even if the path changes to meet the constraint condition, that is, the flag bit S is restored from 0 to 1. In other words, the network device R1 selects a path that meets the constraint condition and that has a stable link status to forward the packet, to ensure high-quality packet transmission.

For example, when determining that the second path does not meet the constraint condition, if the network device R1 determines that the flag bit S of the first path has been updated to 1, that is, the first path has been updated to meet the constraint condition, even if a path priority of the first path is higher than that of the third path, the network device R1 may choose, in some cases, to switch the packet forwarding path to the third path, instead of switching back to the first path. After the network device R1 determines that the first path does not meet the constraint condition and switches to the second path, the network device R1 may start a timer for the first path. Within a preset duration range of the timer, even if an SLA of the first path is restored to meet the constraint condition, the network device R1 still does not choose to switch back to the first path. For another example, after switching the forwarding path from the first path to the second path, the network device R1 detects that the status of the first path with a higher priority is restored. However, due to an action of the timer, the network device R1 does not actively switch the forwarding path from the second path to the first path, thereby ensuring stable network running.

The foregoing embodiment is described by using an example in which the network device autonomously determines, based on the path constraint information sent by the controller 01, whether to switch the packet forwarding path. In an alternative implementation, constraint information that is of each path and that is sent by the controller 01 may further include indication information of the path, and the indication information may be used to indicate whether to use the path as the packet forwarding path. Correspondingly, after receiving the constraint information, the network device may directly determine, based on an indication of the indication information, whether to switch the packet forwarding path.

That is, in this alternative implementation, the controller 01 may determine whether to switch the packet forwarding path, and the network device only needs to perform a corresponding path switching operation according to an indication of the controller 01. Because the network device does not need to determine, based on the constraint information, whether to switch the path, path switching logic on the network device side is effectively simplified.

Figure 7:
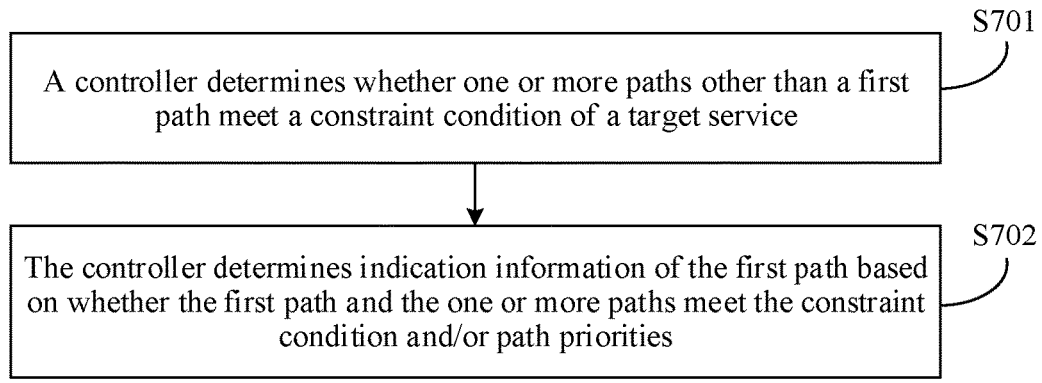
FIG. 7 is a flowchart of a method for generating indication information of a first path according to an embodiment.

For example, the first path is a path currently used for packet forwarding. As shown in FIG. 7, a process in which the controller generates indication information of the first path after determining whether the first path meets the constraint condition is as follows:

S701: The controller determines whether one or more paths other than the first path meet the constraint condition of the target service.

The one or more paths and the first path have the same head node and the same tail node. In addition, the one or more paths and the first path belong to the same path association group. For an implementation process of S701, refer to S304 or S306. Details are not described herein again.

S702: The controller determines indication information of the first path based on whether the first path and the one or more paths meet the constraint condition and/or path priorities.

After determining whether each path meets the constraint condition, the controller may determine the indication information of the first path based on whether each path meets the constraint condition and/or the path priorities. In addition, if the controller determines that the packet forwarding path needs to be switched from the first path to another path, the controller may further generate and deliver indication information of the another path.

Optionally, if the controller determines that the first path does not meet the constraint condition, and the paths other than the first path include a path that meets the constraint condition, the indication information of the first path generated by the controller may indicate that the first path is not used for packet forwarding. If the controller determines that the first path meets the constraint condition, the controller may determine that the packet forwarding path does not need to be switched. In this case, the indication information of the first path generated by the controller may indicate that the first path is used for packet forwarding. If the controller determines that the first path does not meet the constraint condition, and none of the paths other than the first path meet the constraint condition, the indication information of the first path generated by the controller may indicate that the first path is used for packet forwarding.

Assuming that the path association group to which the first path belongs includes only the first path and the second path, the indication information of the first path generated by the controller may include the following cases:

(1) If the controller determines that the second path meets the constraint condition and the first path does not meet the constraint condition, the indication information of the first path is used to indicate that the first path is not used for packet forwarding. In addition, the controller may generate and deliver indication information of the second path, where the indication information of the second path may be used to indicate that the second path is the packet forwarding path.

(2) If the controller determines that the first path meets the constraint condition, the indication information is used to indicate that the first path is the packet forwarding path.

(3) If the controller determines that neither of the first path and the second path meet the constraint condition, the indication information is used to indicate that the first path is the packet forwarding path.

Correspondingly, after receiving the first constraint information including the indication information, the network device may directly determine, based on the indication information, whether to switch the packet forwarding path.

For example, if the indication information in the first constraint information is used to indicate that the first path is the packet forwarding path, the network device may not switch the packet forwarding path. If the indication information in the first constraint information is used to indicate that the first path is not used for packet forwarding, and the indication information in the second constraint information of the second path is used to indicate that the second path is the packet forwarding path, the network device may switch the packet forwarding path from the first path to the second path.

It should be understood that, in this embodiment, the controller may deliver the indication information of the first path when determining that the first path needs to be switched or the first path does not need to be switched. Alternatively, the controller may deliver the indication information of the first path only when determining that the first path needs to be switched, and skip delivering the indication information of the first path when determining that the first path does not need to be switched. In other words, if the network device does not receive the indication information that is of the first path and that is delivered by the controller, the network device may continue to forward the packet by using the first path.

The following uses the network topology shown in FIG. 1 as an example, and uses an example in which the controller 01 obtains, through computation, the first path, the second path, and the third path that are between the head node R1 and the tail node R8 and that meet the constraint condition, to describe a process in which the controller delivers indication information of each path.

After obtaining, through computation, the three paths that meet the constraint condition, if the controller 01 determines that a priority of the first path is higher, the controller 01 may indicate the network device R1 to use the first path as the packet forwarding path. Correspondingly, the controller 01 may sequentially deliver the three paths to the network device R1 by using PCUpd packets. The PCUpd packets used to deliver the paths may each include an ASSOCIATION object, a flag bit S in each ASSOCIATION object is set to 1, an indicator bit A of the first path is set to 1, and an indicator bit A of the second path and an indicator bit A of the third path are both set to 0. The network device R1 may further forward a packet by using the first path based on indication information of each path.

If the controller 01 detects, in a time period, that the first path does not meet the constraint condition, the controller 01 may determine that the packet forwarding path needs to be switched to another path. If the controller 01 determines that both the second path and the third path meet the constraint condition at this time, the controller 01 may determine, based on a fact that a priority of the second path is higher than a priority of the third path, that the packet forwarding path needs to be switched to the second path. Then, the controller 01 may deliver a PCUpd packet to the network device R1, where the PCUpd packet carries a path identifier of the first path and a path identifier of the second path. In addition, a flag bit S in an SLA-Constrained Association field of the first path is 0, and an indicator bit A is 0; a flag bit S in an SLA-Constrained Association field of the second path is 1, and an indicator bit A is 1. After receiving the PCUpd packet, the network device R1 may switch the packet forwarding path from the first path to the second path.

If the controller 01 detects that the first path does not meet the constraint condition and the second path does not meet the constraint condition either, but the third path meets the constraint condition, the controller 01 may determine that the packet forwarding path needs to be switched to the third path. Correspondingly, in the PCUpd packet delivered by the controller 01 to the network device R1, a flag bit S in an SLA-Constrained Association field of the third path is 1, and an indicator bit A is 1; a flag bit S of the first path and a flag bit S of the second path are both 0, and an indicator bit A of the first path and an indicator bit A of the second path are both 0.

When detecting that the first path does not meet the constraint condition, if the controller 01 determines that neither of the second path and the third path meet the constraint condition, the controller 01 may determine not to switch the packet forwarding path. In addition, the controller 01 may deliver a PCUpd packet to the network device R1, where the PCUpd packet carries the path identifier of the first path, a flag bit S in an SLA-Constrained Association field of the PCUpd packet is 0, and an indicator bit A is 1.

Referring to FIG. 6, it can be learned that two bytes in the optional TLV field in the ASSOCIATION object may be used as a length field. The length field may be used to indicate a total length of an unassigned flags field, a flag bit S, and an indicator bit A. For example, the total length may be 4 bytes. In addition, in this embodiment, to ensure accurate identification of the flag bit S and the indicator bit A, the unassigned flags field should be set to 0, and the controller and the network device need to ignore the unassigned flags field.

The foregoing manner of indicating, by using the indicator bit, whether a path meets the constraint condition is merely a possible example. It may be understood that the controller may notify the network device in another carrying manner.

It should be understood that a sequence of the steps in the path switching method provided in this embodiment may be properly adjusted, or a step may be correspondingly added or skipped based on a situation. For example, S306 and S307 may be skipped based on a situation, that is, the controller may send only the first constraint information of the first path. Alternatively, S306 and S307 may be performed before S305. In other words, the controller may first send the second constraint information and then send the first constraint information. Alternatively, S309 may be skipped based on a situation, that is, the network device may not need to report a path switching result to the controller.

In conclusion, this embodiment provides a path switching method. The network device serving as the head node on the first path may determine, based on the obtained first constraint information, whether the first path meets the constraint condition of the target service, and further determine whether to switch the packet forwarding path from the first path to another path. Compared with switching a packet forwarding path only based on a fault status of a path, the method provided in this embodiment effectively improves flexibility of path switching. In addition, it can be further ensured as much as possible that the packet forwarding path is a path that meets the constraint condition, so that the packet of the target service can be transmitted with high quality.

In addition, in the method provided, the network device may switch paths based on the obtained constraint information of all paths in the same path association group, thereby implementing centralized management of the paths in the same path association group, and simplifying a network operation and maintenance process. In addition, in the path switching process, the network device does not delete a path that does not meet the constraint condition but has connectivity, thereby effectively enhancing reliability of the entire communications system.

Figure 8:
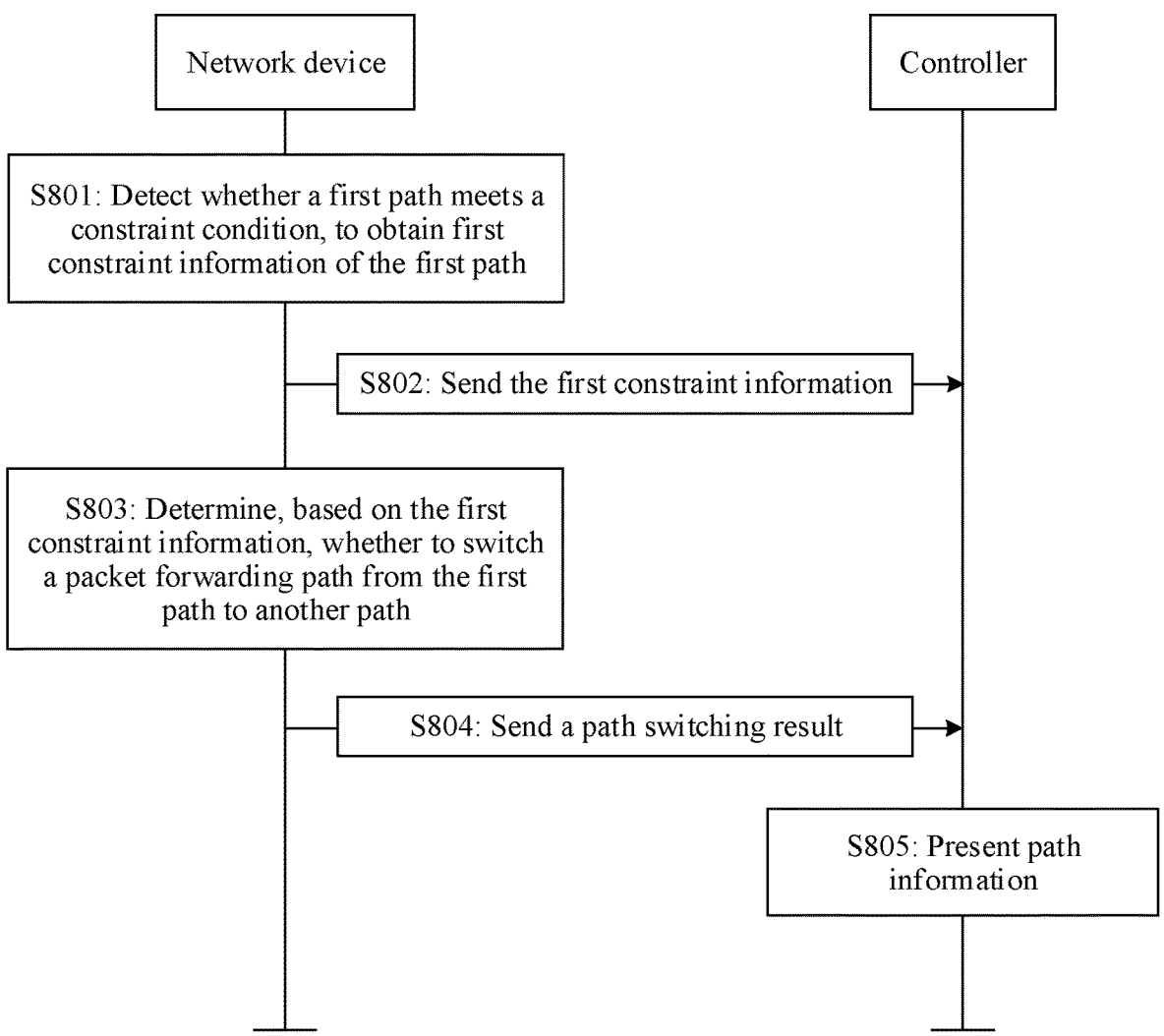
FIG. 8 is a flowchart of still another path switching method according to an embodiment.

FIG. 8 is a flowchart of still another path switching method according to an embodiment. The method may be applied to the communications system shown in FIG. 1. In this embodiment, an example in which a network device serving as a head node on a path generates constraint information of each path is used for description. Refer to FIG. 8. The method may include the following steps.

S801: A network device detects whether a first path meets the constraint condition, to obtain first constraint information of the first path.

In this embodiment, the network device serving as the head node on the first path may have a function of detecting whether the path meets the constraint condition. The network device may detect whether the first path meets the constraint condition, to obtain the first constraint information of the first path. For an implementation process of S801, refer to S304. Details are not described herein again.

S802: The network device sends the first constraint information to the controller.

The network device may send the first constraint information to the controller by using PCEP or BGP. For example, the network device may send a second packet carrying the first constraint information to the controller. The second packet may be a PCReq packet or a PCRpt packet. In addition, the second packet may carry the first constraint information by using an ASSOCIATION object. For an implementation process of S802, refer to S305. Details are not described herein again.

S803: The network device determines, based on the first constraint information, whether to switch a packet forwarding path from the first path to another path.

The network device may determine, based on whether the first path meets the constraint condition, whether to switch the packet forwarding path from the first path to another path. It should be understood that if a path association group to which the first path belongs further includes another path other than the first path, the network device may further obtain constraint information of the another path, and determine, based on the first constraint information and the constraint information of the another path, whether to switch the packet forwarding path from the first path to the another path. For an implementation process of S803, refer to S203 or S308. Details are not described herein again.

S804: The network device sends a path switching result to the controller.

After switching the packet forwarding path from the first path to the another path, the network device may send the path switching result to the controller. For example, the network device may send, to the controller, a PCReq packet or a PCRpt packet that carries the path switching result. For an implementation process of S804, refer to S309. Details are not described herein again.

S805: The controller presents path information.

After receiving the first constraint information and/or the path switching result sent by the network device, the controller may present the path information. The path information may be used to indicate whether each path in the path association group meets the constraint condition, and the path information may be further used to indicate a path currently used for packet forwarding in the path association group.

Based on the foregoing description, it can be learned that the network device may autonomously detect whether a path meets the constraint condition, and switch a path. The controller only needs to present the path information based on the constraint information and the path switching result that are sent by the network device. In this implementation scenario, functions of the network device are relatively rich, and functions of the controller are simplified. For example, the controller may only need to retain functions such as an information presentation function and an alarm function.

It should be understood that a sequence of the steps in the path switching method provided in this embodiment may be properly adjusted, or a step may be correspondingly added or skipped based on a situation. For example, S802 or S804 may be skipped based on a situation. To be specific, the network device may report only the first constraint information, or report only the path switching result.

In conclusion, this embodiment provides a path switching method. The network device serving as the head node on the first path may determine, based on the obtained first constraint information, whether the first path meets the constraint condition of the target service, and further determine whether to switch the packet forwarding path from the first path to another path. Compared with switching a packet forwarding path only based on a fault status of a path, the method provided in this embodiment effectively improves flexibility of path switching. In addition, it can be further ensured as much as possible that the packet forwarding path is a path that meets the constraint condition, so that the packet of the target service can be transmitted with high quality.

In addition, in the method provided, the network device may switch paths based on the obtained constraint information of all paths in the same path association group, thereby implementing centralized management of the paths in the same path association group, and simplifying a network operation and maintenance process. In addition, in the path switching process, the network device does not delete a path that does not meet the constraint condition but has connectivity, thereby effectively enhancing reliability of the entire communications system.

Figure 9:
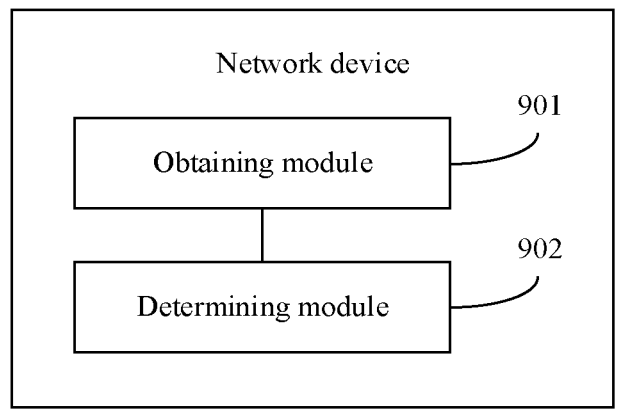
FIG. 9 is a schematic diagram of a structure of a network device according to an embodiment.

FIG. 9 is a schematic diagram of a structure of a network device according to an embodiment. The network device may be a PE device or a P device, or may be another type of device. In addition, the network device may be used to implement the steps performed by the network device in the foregoing embodiment. As shown in FIG. 9, the network device may include an obtaining module 901 and a determining module 902.

The obtaining module 901 is configured to obtain first constraint information of a first path, where the first path is a packet forwarding path of the network device, the first constraint information is used to indicate whether the first path meets a constraint condition of a target service, and the network device is a head node on the first path. For function implementation of the obtaining module 901, refer to related descriptions of S202, S305, or S801 in the foregoing method embodiment.

The determining module 902 is configured to determine, based on the first constraint information, whether to switch the packet forwarding path from the first path to another path. For function implementation of the determining module 902, refer to related descriptions of S203 or S803 in the foregoing method embodiment.

Optionally, the obtaining module 901 may be further configured to obtain second constraint information of a second path, where the second constraint information is used to indicate whether the second path meets the constraint condition, and the second path and the first path have the same head node and a same tail node. For function implementation of the obtaining module 901, refer to related descriptions of S307 in the foregoing method embodiment.

The determining module 902 may be configured to determine, based on the first constraint information and the second constraint information, whether to switch the first path. For function implementation of the determining module 902, refer to related descriptions of S308 in the foregoing method embodiment.

Optionally, the determining module 902 may be configured to: determine, based on the first constraint information, that the first path does not meet the constraint condition; determine, based on the second constraint information, that the second path meets the constraint condition; and switch the packet forwarding path to the second path.

Optionally, the obtaining module 901 may be further configured to obtain third constraint information of a third path, where the third constraint information is used to indicate whether the third path meets the constraint condition, and the third path and the first path have the same head node and the same tail node.

The determining module 902 is configured to: determine, based on the first constraint information, that the first path does not meet the constraint condition; determine, based on the second constraint information, that the second path meets the constraint condition; determine, based on the third constraint information, that the third path meets the constraint condition; and switch, based on a fact that a priority of the second path is higher than a priority of the third path, the packet forwarding path to the second path.

Optionally, the determining module 902 is configured to: determine, based on the first constraint information, that the first path does not meet the constraint condition; determine, based on the second constraint information, that the second path does not meet the constraint condition; and determine not to switch the first path, or switch the packet forwarding path by using a protection mechanism.

Optionally, the protection mechanism includes an SR-BE mechanism and/or a VPN FRR mechanism.

Optionally, the determining module 902 is configured to: determine, based on the first constraint information, that the first path does not meet the constraint condition; determine, based on the second constraint information, that the second path meets the constraint condition; determine that duration after the second path changes from not meeting the constraint condition to meeting the constraint condition is less than a duration threshold; and skip switching the packet forwarding path to the second path.

Optionally, both the first path and the second path belong to a same SR tunnel.

Optionally, both the first path and the second path are obtained through computation based on SR-TE and the constraint condition, head nodes indicated by source addresses of the first path and the second path are the same, tail nodes indicated by destination addresses of the first path and the second path are the same, and tunnel identifications of the first path and the second path are the same. Alternatively, both the first path and the second path are obtained through computation based on an SR policy and the constraint condition, head-end identifiers of the first path and the second path indicate the same head node, color identifiers of the first path and the second path are the same, and endpoint identifiers of the first path and the second path indicate the same tail node.

Optionally, the obtaining module 901 is configured to obtain the second constraint information of the second path based on a fact that the second path and the first path belong to a same path association group.

Optionally, the obtaining module 901 is configured to receive the first constraint information of the first path that is sent by a controller; or detect whether the first path meets the constraint condition, to obtain the first constraint information of the first path.

Optionally, the obtaining module 901 is configured to receive the first constraint information of the first path that is sent by the controller by using PCEP; or receive the first constraint information of the first path that is sent by the controller by using BGP.

Optionally, the obtaining module 901 is configured to receive a packet that is sent by the controller by using PCEP and that carries the first constraint information, where the packet is a path computation update packet, a path computation initiate packet, or a path computation reply packet.

Figure 10:
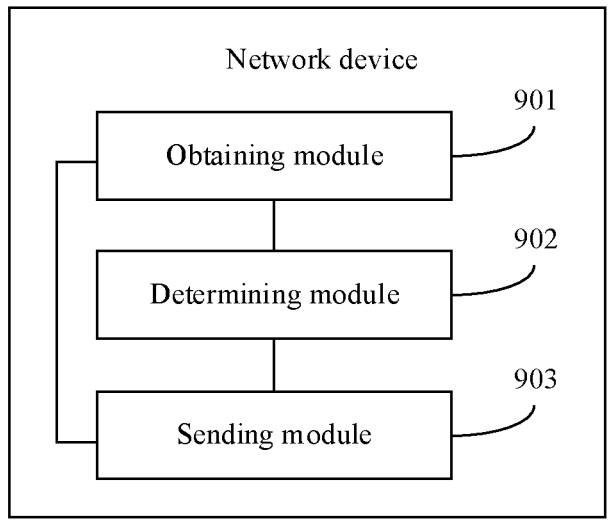
FIG. 10 is a schematic diagram of a structure of another network device according to an embodiment.

Optionally, as shown in FIG. 10, the network device may further include a sending module 903 configured to: after the obtaining module 901 detects whether the first path meets the constraint condition, to obtain the first constraint information of the first path, send the first constraint information to the controller, or send a path switching result determined based on the first constraint information to the controller. For function implementation of the sending module 903, refer to related descriptions of S309, S802, or S804 in the foregoing method embodiment.

Optionally, the first constraint information includes indication information, the indication information is used to indicate whether to use the first path as the packet forwarding path, and the obtaining module 901 is configured to receive the first constraint information that is sent by the controller and that includes the indication information.

The determining module 902 is configured to determine, based on the indication information, whether to switch the packet forwarding path from the first path to another path.

In conclusion, this embodiment provides a network device. The network device serving as the head node on the first path may determine, based on the obtained first constraint information, whether the first path meets the constraint condition of the target service, and further determine whether to switch the packet forwarding path from the first path to another path. Compared with switching a packet forwarding path only based on a fault status of a path, the network device provided in this embodiment effectively improves flexibility of path switching. In addition, it can be further ensured as much as possible that the packet forwarding path is a path that meets the constraint condition, so that the packet of the target service can be transmitted with high quality.

Figure 11:
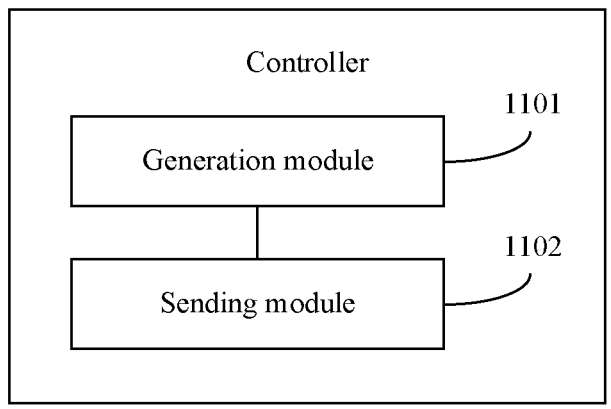
FIG. 11 is a schematic diagram of a structure of a controller according to an embodiment.

FIG. 11 is a schematic diagram of a structure of a controller according to an embodiment. The controller may be applied to the system shown in FIG. 1, and may be configured to implement steps performed by the controller in the foregoing method embodiments. As shown in FIG. 11, the controller may include a generation module 1101 and a sending module 1102.

The generation module 1101 is configured to generate first constraint information of a first path based on whether the first path meets a constraint condition of a target service. For function implementation of the generation module 1101, refer to related descriptions of S201 or S304 in the foregoing method embodiment.

The sending module 1102 is configured to send the first constraint information to a network device, where the first constraint information is used to indicate the network device to determine, based on the first constraint information, whether to switch a packet forwarding path, and the network device is a head node on the first path. For function implementation of the sending module 1102, refer to related descriptions of S202 or S305 in the foregoing method embodiment.

Optionally, the sending module 1102 is configured to send the first constraint information of the first path to the network device by using PCEP, or send the first constraint information of the first path to the network device by using BGP.

Optionally, the sending module 1102 is configured to send, to the network device by using PCEP, a packet that carries the first constraint information, where the packet is a path computation update packet, a path computation initiate packet, or a path computation reply packet.

Optionally, the generation module 1101 is further configured to generate second constraint information of a second path based on whether the second path meets the constraint condition of the target service, where the second path and the first path have the same head node and a same tail node. For function implementation of the generation module 1101, refer to related descriptions of S306 in the foregoing method embodiment.

The sending module 1102 is further configured to send the second constraint information to the network device. That the first constraint information is used to indicate the network device to determine, based on the first constraint information, whether to switch a packet forwarding path includes: The first constraint information and the second constraint information are used to indicate the network device to determine, based on the first constraint information and the second constraint information, whether to switch the packet forwarding path. For function implementation of the sending module 1102, refer to related descriptions of S307 in the foregoing method embodiment.

Optionally, the first path and the second path belong to a same path association group, and the path association group is indicated by an association group identifier. That the first constraint information and the second constraint information are used to indicate the network device to determine, based on the first constraint information and the second constraint information, whether to switch the packet forwarding path includes: The association group identifier is used to indicate the network device to determine, based on the first constraint information and the second constraint information and based on a fact that the first path and the second path belong to the same path association group, whether to switch the packet forwarding path.

Optionally, the first constraint information includes indication information, and the indication information is used to indicate whether to use the first path as the packet forwarding path. That the controller sends the first constraint information to a network device includes: The controller sends the first constraint information including the indication information to the network device, to indicate the network device to determine, based on the indication information, whether to switch the packet forwarding path.

Optionally, the generation module 1101 is further configured to determine whether a second path meets the constraint condition of the target service. The second path and the first path have the same head node and a same tail node.

If the generation module 1101 determines that the second path meets the constraint condition and the first path does not meet the constraint condition, the indication information is used to indicate not to use the first path to forward a packet.

If the generation module 1101 determines that both the first path and the second path meet the constraint condition, the indication information is used to indicate that the first path is the packet forwarding path.

If the generation module 1101 determines that neither of the first path and the second path meet the constraint condition, the indication information is used to indicate that the first path is the packet forwarding path.

Optionally, the generation module 1101 may be further configured to: determine whether one or more paths other than the first path meet the constraint condition of the target service, where the one or more paths and the first path have the same head node and a same tail node; and before the sending module 1102 sends the first constraint information including the indication information to the network device, determine the indication information of the first path based on whether the first path and the one or more paths meet the constraint condition and/or path priorities. For function implementation of the generation module 1101, refer to related descriptions of S701 and S702 in the foregoing method embodiment.

In conclusion, this embodiment provides a controller. The controller may send the first constraint information of the first path to the head node on the first path, so that the head node can determine, based on the received first constraint information, whether to switch the packet forwarding path from the first path to another path. Compared with switching a packet forwarding path only based on a fault status of a path, the solution provided in this embodiment effectively improves flexibility of path switching. In addition, it can be further ensured as much as possible that the packet forwarding path is a path that meets the constraint condition, so that the packet of the target service can be transmitted with high quality.

It may be clearly understood by a person skilled in the art that, for the purpose of convenient and brief description, for a detailed working process of the foregoing network device, controller, and modules, refer to a corresponding process in the foregoing method embodiments. Details are not described herein again.

It should be understood that the network device and the controller provided in the embodiments may be further implemented by using an application-specific integrated circuit (ASIC) or a programmable logic device (PLD). The PLD may be a complex PLD (CPLD), a field-programmable gate array (FPGA), generic array logic (GAL), or any combination thereof. Alternatively, the path switching method provided in the foregoing method embodiment may be implemented by using software. When the path switching method provided in the foregoing method embodiment is implemented by using software, modules in the network device and the controller provided in the embodiments may alternatively be software modules.

Figure 12:
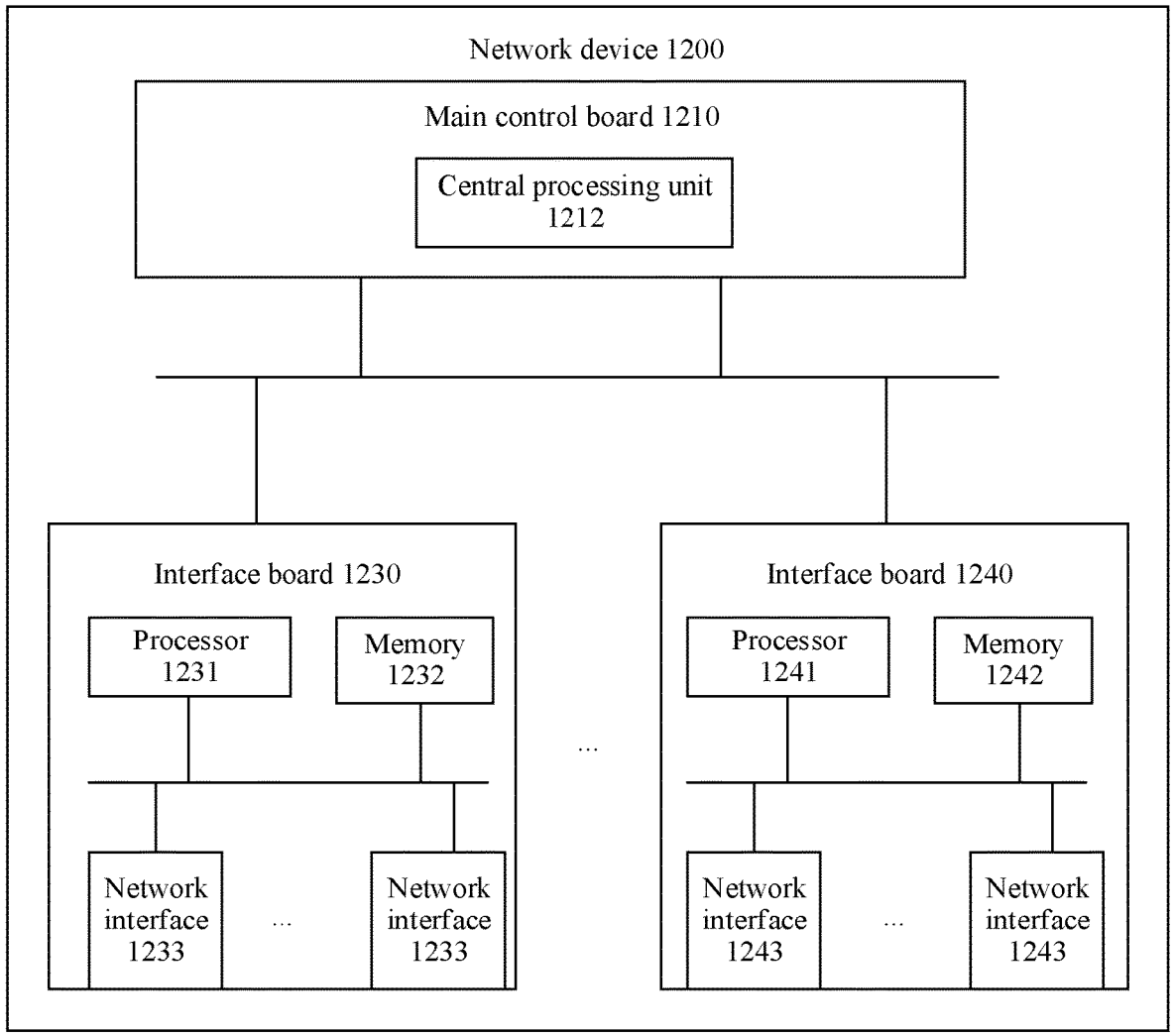
FIG. 12 is a schematic diagram of a structure of still another network device according to an embodiment.

FIG. 12 is a schematic diagram of a structure of still another network device according to an embodiment. The network device 1200 may be the network device in any one of the foregoing embodiments. The network device 1200 may be applied to the system shown in FIG. 1, and the network device 1200 may be a PE device or a P device. As shown in FIG. 12, the network device 1200 includes a main control board 1210, an interface board 1230, and an interface board 1240. When there are a plurality of interface boards, a switching board (not shown in the figure) may be included. The switching board is configured to implement data exchange between interface boards (the interface board is also referred to as a line card or a service board).

The main control board 1210 is configured to complete functions such as system management, device maintenance, and protocol processing. The interface boards 1230 and 1240 are configured to provide various service interfaces (for example, a Packet over SONET/SDH (POS), a Gigabit Ethernet (GE), and an asynchronous transfer mode (ATM) interface), and forward a packet. The main control board 1210 mainly includes three types of function units: a system management and control unit, a system clock unit, and a system maintenance unit. The main control board 1210, the interface board 1230, and the interface board 1240 are connected to a platform backboard by using a system bus to implement interworking. The interface board 1230 includes one or more processors 1231. The processor 1231 is configured to control and manage the interface board, communicate with a central processing unit 1212 on the main control board 1210, and forward a packet. A memory 1232 on the interface board 1230 is configured to store a forwarding entry, and the processor 1231 forwards a packet by searching the forwarding entry stored in the memory 1232.

The interface board 1230 includes one or more network interfaces 1233 configured to receive a packet sent by a previous-hop node, and send a processed packet to a next-hop node according to an instruction of the processor 1231. Specific implementation processes are not described herein again. Specific functions of the processor 1231 are not described herein again.

It may be understood that, as shown in FIG. 12, this embodiment includes a plurality of interface boards, and uses a distributed forwarding mechanism. In this mechanism, operations on the interface board 1240 are basically similar to operations on the interface board 1230. For brevity, details are not described again. In addition, it may be understood that the processor 1231 on the interface board 1230 and/or the processor 1241 in FIG. 12 may be dedicated hardware or a chip, for example, a network processor or an ASIC, to implement the foregoing functions. This implementation is generally referred to as a manner of using dedicated hardware or a chip for processing on a forwarding plane. In another implementation, the processor 1231 and/or the processor 1241 may alternatively be a general-purpose processor, for example, a general-purpose CPU, to implement the foregoing functions.

In addition, it should be understood that there may be one or more main control boards. When there are a plurality of main control boards, a primary main control board and a secondary main control board may be included. There may be one or more interface boards, and a device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 1232 may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc ROM (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory is not limited thereto. The memory 1232 may exist independently, and is connected to the processor 1231 by using a communications bus. The memory 1232 may alternatively be integrated with the processor 1231.

The memory 1232 is configured to store program code, and execution is controlled by the processor 1231, to perform the path switching method provided in the foregoing embodiment. The processor 1231 is configured to execute the program code stored in the memory 1232. The program code may include one or more software modules. The one or more software modules may be the functional modules provided in the embodiment shown in FIG. 8 or FIG. 9, or may be the functional modules provided in the embodiment shown in FIG. 10 or FIG. 11.

In a specific embodiment, the network interface 1233 may be an apparatus that uses any transceiver, and is configured to communicate with another device or a communications network, for example, the Ethernet, a radio access network (RAN), or a wireless local area network (WLAN).

Figure 13:
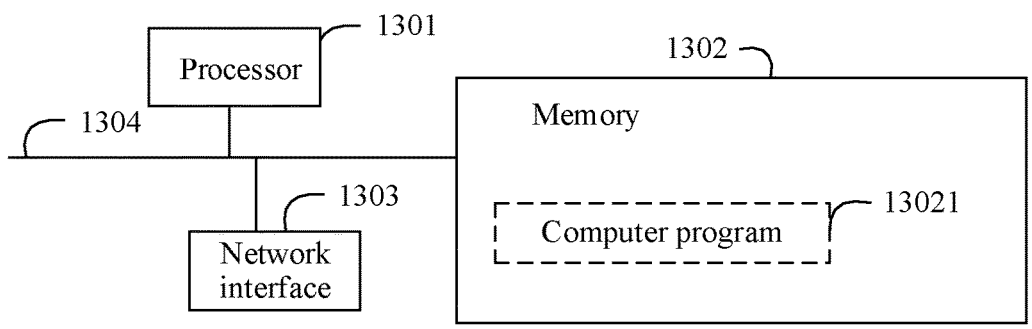
FIG. 13 is a schematic diagram of a structure of a device according to an embodiment.

FIG. 13 is a schematic diagram of a structure of a device according to an embodiment. The device may be the network device or the controller in the foregoing embodiments. Refer to FIG. 13. The device may include a processor 1301, a memory 1302, a transceiver 1303, and a bus 1304. The bus 1304 is configured to connect the processor 1301, the memory 1302, and the transceiver 1303. The transceiver 1303 (which may be wired or wireless) may implement a communication connection to another device. The memory 1302 stores computer programs, and the computer programs are used to implement various functions.

It should be understood that in this embodiment, the processor 1301 may be a CPU, or the processor 1301 may be another general-purpose processor, a digital signal processor (DSP), an ASIC, an FPGA, a graphics processing unit (GPU) or another PLD, a discrete gate or transistor logic device, a discrete hardware component, or the like. The general-purpose processor may be a microprocessor, any conventional processor, or the like.

The memory 1302 may be a volatile memory or a nonvolatile memory, or may include a volatile memory and a nonvolatile memory. The nonvolatile memory may be a ROM, a programmable ROM (PROM), an erasable PROM (EPROM), an EEPROM, or a flash memory. The volatile memory may be a RAM and is used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a SynchLink DRAM, and a Direct Rambus (DR) DRAM.

The bus 1304 may further include a power bus, a control bus, a status signal bus, and the like, in addition to a data bus. However, for clear description, various types of buses are marked as the bus 1304 in the figure.

When the device is the network device, the processor 1301 is configured to execute the computer program stored in the memory 1302, and the processor 1301 implements the steps performed by the network device in the foregoing method embodiments by executing the computer program 13021.

When the device is the controller, the processor 1301 is configured to execute the computer program stored in the memory 1302, and the processor 1301 implements the steps performed by the controller in the foregoing method embodiments by executing the computer program 13021.

An embodiment further provides a computer-readable storage medium. The computer-readable storage medium stores instructions, and the instructions are executed by a processor to implement the steps performed by the network device or the controller in the foregoing method embodiments.

An embodiment further provides a computer program product including instructions. When the computer program product runs on a computer, the computer is enabled to perform the steps performed by the network device or the controller in the foregoing method embodiments.

An embodiment further provides a communications system. As shown in FIG. 1, the communications system may include a controller 01 and at least one network device. A network device serving as a head node on a path in the at least one network device may be the device shown in FIG. 9, FIG. 10, FIG. 12, or FIG. 13, and the controller 01 may be the controller shown in FIG. 11 or FIG. 13.

Optionally, the network device may be a PE device or a P device, and the controller 01 may be an SDN controller, for example, may be a PCE server.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer instructions are loaded and executed on a computer, the procedures or functions according to the embodiments are partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

It should be understood that "and/or" mentioned in this specification indicates that there may be three relationships, for example, A and/or B may indicate that only A exists, both A and B exist, and only B exists. The character "/" usually indicates an "or" relationship between the associated objects.

The foregoing descriptions are merely optional implementations, but are not intended to limit the protection scope of this disclosure. Any modification or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method implemented by a network device and comprising:
   obtaining first constraint information of a first path, wherein the first path is a packet forwarding path of the network device, wherein the first constraint information indicates whether the first path meets a constraint condition of a target service, and wherein the network device is a first head node on the first path;
   obtaining second constraint information of a second path, wherein the second constraint information indicates whether the second path meets the constraint condition, wherein the network device is a second head node of the second path, and wherein the second path and the first path have a same tail node;
   determining, based on the first constraint information and the second constraint information, whether to switch the packet forwarding path from the first path to another path; and
   skipping switching the packet forwarding path to the second path when the first path does not meet the constraint condition, the second path meets the constraint condition, and a duration after the second path changes from not meeting the constraint condition to meeting the constraint condition is less than a duration threshold.

2. The method of claim 1, further comprising switching the packet forwarding path to the second path when the first path does not meet the constraint condition, the second path meets the constraint condition, and the duration is not less than the duration threshold.

3. The method of claim 1, further comprising:
   obtaining third constraint information of a third path, wherein the third constraint information indicates whether the third path meets the constraint condition, wherein the network device is a third head node of the third path, and wherein the third path and the first path have a same tail node; and
   switching, the packet forwarding path to the second path when the first path does not meet the constraint condition, the second path meets the constraint condition, the third path meets the constraint condition, and a second priority of the second path is higher than a third priority of the third path.

4. The method of claim 1, wherein determining whether to switch the first path comprises determining, to not switch the packet forwarding path or to switch the packet forwarding path using a protection mechanism when the first path does not meet the constraint condition and the second path does not meet the constraint condition.

5. The method of claim 4, wherein the protection mechanism comprises a segment routing best effort (SR-BE) mechanism or a virtual private network (VPN) fast reroute (FRR) mechanism.

6. The method of claim 1, wherein both the first path and the second path belong to a same segment routing (SR) tunnel.

7. The method of claim 6, further comprising:
   obtaining the first path and the second path through computation based on SR traffic engineering and the constraint condition, wherein head nodes indicated by source addresses of the first path and the second path are the same, tail nodes indicated by destination addresses of the first path and the second path are the same, and tunnel identifications of the first path and the second path are the same; or
   obtaining the first path and the second path through computation based on an SR policy and the constraint condition, wherein head-end identifiers of the first path and the second path indicate a same head node, color identifiers of the first path and the second path are the same, and endpoint identifiers of the first path and the second path indicate the same tail node.

8. The method of claim 1, further comprising further obtaining the second constraint information based on the second path and the first path belonging to a same path association group.

9. The method of claim 1, wherein obtaining the first constraint information comprises:
   receiving the first constraint information from a controller; or
   detecting that the first path meets the constraint condition.

10. The method of claim 9, wherein receiving the first constraint information from the controller comprises receiving the first constraint information of the first path using a Path Computation Element Communication Protocol (PCEP) or a Border Gateway Protocol (BGP).

11. The method of claim 10, wherein receiving the first constraint information comprises receiving a packet that carries the first constraint information, and wherein the packet is a path computation update packet, a path computation initiate packet, or a path computation reply packet.

12. The method of claim 9, wherein after detecting that the first path meets the constraint condition, the method further comprises sending, to the controller, the first constraint information or a path switching result based on the first constraint information.

13. The method of claim 1, wherein the first constraint information comprises indication information indicating whether to use the first path as the packet forwarding path, and wherein the method further comprises:
receiving, from a controller, the first constraint information; and
further determining, based on the indication information, whether to switch the packet forwarding path.

14. The method of claim 1, wherein the constraint condition is a delay, a packet loss rate, a jitter, or bandwidth utilization.

15. A network device comprising:
a memory configured to store instructions; and
one or more processors coupled to the memory and configured to execute the instructions to cause the network device to:
obtain first constraint information of a first path, wherein the first path is a packet forwarding path of the network device, wherein the first constraint information indicates whether the first path meets a constraint condition of a target service, and wherein the network device is a first head node on the first path;
obtain second constraint information of a second path based on the second path and the first path belonging to a same path association group, wherein the second constraint information indicates whether the second path meets the constraint condition, wherein the network device is a second head node of the second path, and wherein the second path and the first path have a same tail node; and
determine, based on the first constraint information, whether to switch the packet forwarding path from the first path to another path.

16. The network device of claim 15, wherein the constraint condition is a delay, a packet loss rate, a jitter, or bandwidth utilization.

17. The network device of claim 15, wherein the one or more processors are further configured to execute the instructions to cause the network device to skip switching the packet forwarding path to the second path when the first path does not meet the constraint condition, the second path meets the constraint condition, and a duration after the second path changes from not meeting the constraint condition to meeting the constraint condition is less than a duration threshold.

18. The network device of claim 17, wherein the one or more processors are further configured to execute the instructions to cause the network device to switch the packet forwarding path to the second path when the first path does not meet the constraint condition, the second path meets the constraint condition, and the duration is not less than the duration threshold.

19. The network device of claim 15, wherein the one or more processors are further configured to execute the instructions to cause the network device to:
obtain third constraint information of a third path, wherein the third constraint information indicates whether the third path meets the constraint condition, wherein the network device is a third head node of the third path, and wherein the third path and the first path have a same tail node; and
switch, the packet forwarding path to the second path when the first path does not meet the constraint condition, the second path meets the constraint condition, the third path meets the constraint condition, and a second priority of the second path is higher than a third priority of the third path.

20. The network device of claim 15, wherein the one or more processors are further configured to execute the instructions to cause the network device to determine whether to switch the first path by determining, to not switch the packet forwarding path or to switch the packet forwarding path using a protection mechanism when the first path does not meet the constraint condition and the second path does not meet the constraint condition.

21. The network device of claim 20, wherein the protection mechanism comprises a segment routing best effort (SR-BE) mechanism or a virtual private network (VPN) fast reroute (FRR) mechanism.

22. The network device of claim 15, wherein both the first path and the second path belong to a same segment routing (SR) tunnel.

23. A computer program product comprising instructions that are stored on a computer-readable medium and that, when executed by a processor, cause a network device to:
obtain first constraint information of a first path, wherein the first path is a packet forwarding path of the network device, wherein the first constraint information indicates whether the first path meets a constraint condition of a target service, and wherein the network device is a first head node on the first path;
obtain second constraint information of a second path based on the second path and the first path belonging to a same path association group, wherein the second constraint information indicates whether the second path meets the constraint condition, wherein the network device is a second head node of the second path, and wherein the second path and the first path have a same tail node; and
determine, based on the first constraint information, whether to switch the packet forwarding path from the first path to another path.

* * * * *